(12) United States Patent
Craddock et al.

(10) Patent No.: US 8,601,497 B2
(45) Date of Patent: *Dec. 3, 2013

(54) CONVERTING A MESSAGE SIGNALED INTERRUPTION INTO AN I/O ADAPTER EVENT NOTIFICATION

(75) Inventors: David Craddock, New Paltz, NY (US); Janet R. Easton, Woodstock, NY (US); Mark S. Farrell, Pleasant Valley, NY (US); Thomas A. Gregg, Highland, NY (US); Eric N. Lais, Tillson, NY (US); Gustav E. Sittmann, III, Webster Groves, MO (US); Cynthia Sittmann, legal representative, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,152

(22) Filed: May 2, 2012

(65) Prior Publication Data

US 2012/0221757 A1 Aug. 30, 2012

Related U.S. Application Data

(63) Continuation of application No. 12/821,175, filed on Jun. 23, 2010, now Pat. No. 8,572,635.

(51) Int. Cl.
| | | |
|---|---|---|
| G06F 3/00 | (2006.01) |
| G06F 9/44 | (2006.01) |
| G06F 9/46 | (2006.01) |
| G06F 9/00 | (2006.01) |
| G06F 13/12 | (2006.01) |
| G06F 13/38 | (2006.01) |
| G06F 13/24 | (2006.01) |

(52) U.S. Cl.
USPC .......... 719/321; 719/318; 710/8; 710/62; 710/260

(58) Field of Classification Search
None
See application file for complete search history.

(56) References Cited

U.S. PATENT DOCUMENTS

| 4,028,668 A | 6/1977 | Riikonen |
| 4,271,468 A | 6/1981 | Christensen et al. |

(Continued)

FOREIGN PATENT DOCUMENTS

| EP | 0076921 A2 | 4/1983 |
| EP | 0552873 A1 | 7/1993 |

(Continued)

OTHER PUBLICATIONS

International Search Report and Written Opinion for PCT/EP2010/067035 dated Mar. 8, 2011.

(Continued)

*Primary Examiner* — Charles E Anya
*Assistant Examiner* — Craig Dorais
(74) *Attorney, Agent, or Firm* — John E. Campbell; Blanche E. Schiller, Esq.; Heslin Rothenberg Farley & Mesiti P.C.

(57) ABSTRACT

One or more message signaled interruption requests from one or more input/output (I/O) adapters are converted to I/O adapter event notifications. Each I/O adapter event notification includes the setting of one or more specific indicators in system memory and an interruption request, the first of which results in a pending I/O adapter interruption request. While a request for an I/O adapter interruption is pending, subsequent message signaled interruption requests are converted to I/O adapter event notifications, but do not result in additional requests for I/O adapter interruptions.

10 Claims, 24 Drawing Sheets

(56) References Cited

U.S. PATENT DOCUMENTS

| | | | |
|---|---|---|---|
| 4,323,963 A | 4/1982 | Wu | |
| 5,053,952 A | 10/1991 | Koopman, Jr. et al. | |
| 5,170,472 A | 12/1992 | Cwiakala et al. | |
| 5,265,240 A | 11/1993 | Galbraith et al. | |
| 5,282,274 A | 1/1994 | Liu | |
| 5,430,856 A | 7/1995 | Kinoshita | |
| 5,465,332 A | 11/1995 | Deloye et al. | |
| 5,465,355 A | 11/1995 | Cook et al. | |
| 5,535,352 A | 7/1996 | Bridges et al. | |
| 5,551,013 A | 8/1996 | Beausoleil et al. | |
| 5,574,873 A | 11/1996 | Davidian | |
| 5,586,268 A | 12/1996 | Chen et al. | |
| 5,600,805 A | 2/1997 | Fredericks et al. | |
| 5,617,554 A | 4/1997 | Alpert et al. | |
| 5,742,785 A | 4/1998 | Stone et al. | |
| 5,761,448 A | 6/1998 | Adamson et al. | |
| 5,790,825 A | 8/1998 | Traut | |
| 5,802,590 A | 9/1998 | Draves | |
| 5,819,053 A | 10/1998 | Goodrum et al. | |
| 5,822,616 A | 10/1998 | Hirooka | |
| 5,826,084 A | 10/1998 | Brooks et al. | |
| 5,838,960 A | 11/1998 | Harriman, Jr. | |
| 5,870,598 A | 2/1999 | White et al. | |
| 5,875,343 A * | 2/1999 | Binford et al. | 710/263 |
| 5,901,312 A | 5/1999 | Radko | |
| 5,960,213 A | 9/1999 | Wilson | |
| 5,974,440 A | 10/1999 | Brooks et al. | |
| 5,995,745 A | 11/1999 | Yodaiken | |
| 6,009,261 A | 12/1999 | Scalzi et al. | |
| 6,023,736 A | 2/2000 | Lambeth et al. | |
| 6,067,595 A | 5/2000 | Lindenstruth | |
| 6,078,970 A | 6/2000 | Nordstrom et al. | |
| 6,205,530 B1 | 3/2001 | Kang | |
| 6,308,255 B1 | 10/2001 | Gorishek, IV et al. | |
| 6,330,647 B1 | 12/2001 | Jeddeloh et al. | |
| 6,330,656 B1 | 12/2001 | Bealkowski et al. | |
| 6,349,380 B1 | 2/2002 | Shahidzadeh et al. | |
| 6,397,350 B1 | 5/2002 | Baskey et al. | |
| 6,408,347 B1 | 6/2002 | Smith et al. | |
| 6,463,582 B1 | 10/2002 | Lethin et al. | |
| 6,493,741 B1 | 12/2002 | Emer et al. | |
| 6,519,645 B2 | 2/2003 | Markos et al. | |
| 6,529,978 B1 | 3/2003 | Eide et al. | |
| 6,557,035 B1 | 4/2003 | McKnight | |
| 6,578,191 B1 | 6/2003 | Boehme et al. | |
| 6,581,130 B1 | 6/2003 | Brinkmann, Jr. et al. | |
| 6,615,305 B1 | 9/2003 | Olesen et al. | |
| 6,629,175 B1 | 9/2003 | Manning et al. | |
| 6,654,818 B1 | 11/2003 | Thurber | |
| 6,658,521 B1 | 12/2003 | Biran et al. | |
| 6,704,831 B1 | 3/2004 | Avery | |
| 6,715,011 B1 | 3/2004 | Buckland et al. | |
| 6,721,839 B1 | 4/2004 | Bauman et al. | |
| 6,772,097 B1 | 8/2004 | Kromenaker et al. | |
| 6,772,264 B1 | 8/2004 | Dayan et al. | |
| 6,792,492 B1 | 9/2004 | Griffin | |
| 6,820,164 B2 | 11/2004 | Holm et al. | |
| 6,901,537 B2 | 5/2005 | Dawkins et al. | |
| 6,907,510 B2 | 6/2005 | Bennett et al. | |
| 6,963,940 B1 | 11/2005 | Glassen et al. | |
| 6,968,446 B1 | 11/2005 | McGrath | |
| 6,970,992 B2 | 11/2005 | Gurumoorthy et al. | |
| 6,978,338 B2 | 12/2005 | Wang et al. | |
| 6,996,638 B2 | 2/2006 | Brice, Jr. et al. | |
| 7,065,598 B2 | 6/2006 | Connor et al. | |
| 7,107,384 B1 | 9/2006 | Chen et al. | |
| 7,127,599 B2 | 10/2006 | Brice, Jr. et al. | |
| 7,130,938 B2 | 10/2006 | Brice, Jr. et al. | |
| 7,139,940 B2 | 11/2006 | Arbeitman et al. | |
| 7,174,550 B2 | 2/2007 | Brice, Jr. et al. | |
| 7,177,961 B2 | 2/2007 | Brice, Jr. et al. | |
| 7,200,704 B2 | 4/2007 | Njoku et al. | |
| 7,209,994 B1 | 4/2007 | Klaiber et al. | |
| 7,225,287 B2 | 5/2007 | Wooten | |
| 7,260,664 B2 | 8/2007 | Arndt et al. | |
| 7,277,968 B2 | 10/2007 | Brice, Jr. et al. | |
| 7,296,120 B2 | 11/2007 | Corrigan et al. | |
| 7,302,692 B2 | 11/2007 | Bae et al. | |
| 7,328,296 B1 | 2/2008 | Marmash et al. | |
| 7,334,107 B2 | 2/2008 | Schoinas et al. | |
| 7,340,582 B2 | 3/2008 | Madukkarumukumana | |
| 7,380,041 B2 | 5/2008 | Belmar et al. | |
| 7,398,343 B1 | 7/2008 | Marmash et al. | |
| 7,412,488 B2 | 8/2008 | Jha et al. | |
| 7,418,572 B2 | 8/2008 | Hepkin | |
| 7,420,931 B2 | 9/2008 | Nanda et al. | |
| 7,444,493 B2 | 10/2008 | Schoinas et al. | |
| 7,454,548 B2 | 11/2008 | Belmar et al. | |
| 7,464,191 B2 | 12/2008 | Arndt et al. | |
| 7,464,209 B2 | 12/2008 | Armstrong et al. | |
| 7,475,183 B2 | 1/2009 | Traut et al. | |
| 7,493,425 B2 | 2/2009 | Arndt et al. | |
| 7,496,706 B2 | 2/2009 | Nguyen et al. | |
| 7,496,707 B2 | 2/2009 | Freking et al. | |
| 7,506,087 B2 | 3/2009 | Ho et al. | |
| 7,509,391 B1 | 3/2009 | Chauvel et al. | |
| 7,516,252 B2 | 4/2009 | Krithivas | |
| 7,526,592 B2 | 4/2009 | Tsuruta | |
| 7,529,860 B2 | 5/2009 | Freimuth et al. | |
| 7,530,071 B2 | 5/2009 | Billau et al. | |
| 7,546,406 B2 | 6/2009 | Armstrong et al. | |
| 7,546,487 B2 | 6/2009 | Marisetty et al. | |
| 7,549,090 B2 | 6/2009 | Bailey et al. | |
| 7,552,298 B2 | 6/2009 | Bestler | |
| 7,562,366 B2 | 7/2009 | Pope et al. | |
| 7,567,567 B2 | 7/2009 | Muller et al. | |
| 7,587,531 B2 | 9/2009 | Brice, Jr. et al. | |
| 7,600,053 B2 | 10/2009 | Carlson et al. | |
| 7,606,965 B2 | 10/2009 | Njoku et al. | |
| 7,613,847 B2 | 11/2009 | Kjos et al. | |
| 7,617,340 B2 | 11/2009 | Gregg | |
| 7,617,345 B2 | 11/2009 | Clark et al. | |
| 7,623,460 B2 | 11/2009 | Miyazaki | |
| 7,624,235 B2 | 11/2009 | Wadhawan et al. | |
| 7,627,723 B1 | 12/2009 | Buck et al. | |
| 7,631,097 B2 | 12/2009 | Moch et al. | |
| 7,886,086 B2 | 2/2011 | Sharma et al. | |
| 8,112,556 B2 | 2/2012 | Hanson et al. | |
| 2001/0021971 A1 | 9/2001 | Gibson et al. | |
| 2002/0152334 A1 | 10/2002 | Holm et al. | |
| 2002/0161907 A1 | 10/2002 | Moon | |
| 2003/0056155 A1 | 3/2003 | Austen et al. | |
| 2003/0074541 A1 | 4/2003 | Plambeck | |
| 2004/0015622 A1 | 1/2004 | Avery | |
| 2004/0025166 A1 | 2/2004 | Adlung et al. | |
| 2004/0064618 A1 | 4/2004 | Farrell et al. | |
| 2004/0073905 A1 | 4/2004 | Emer et al. | |
| 2004/0093456 A1 * | 5/2004 | Easton et al. | 710/305 |
| 2004/0117534 A1 | 6/2004 | Parry et al. | |
| 2004/0139304 A1 | 7/2004 | Arimilli et al. | |
| 2004/0199700 A1 | 10/2004 | Clayton | |
| 2004/0236880 A1 | 11/2004 | Barrett | |
| 2005/0033895 A1 | 2/2005 | Lueck et al. | |
| 2005/0071472 A1 | 3/2005 | Arndt et al. | |
| 2005/0114586 A1 | 5/2005 | Brice, Jr. et al. | |
| 2005/0114623 A1 | 5/2005 | Craddock et al. | |
| 2005/0289271 A1 | 12/2005 | Martinez et al. | |
| 2006/0005083 A1 | 1/2006 | Genden et al. | |
| 2006/0064618 A1 | 3/2006 | Wu et al. | |
| 2006/0101181 A1 | 5/2006 | Post et al. | |
| 2006/0130071 A1 | 6/2006 | Martin et al. | |
| 2006/0195617 A1 | 8/2006 | Arndt et al. | |
| 2006/0195644 A1 | 8/2006 | Arndt et al. | |
| 2006/0230208 A1 | 10/2006 | Gregg et al. | |
| 2006/0253619 A1 | 11/2006 | Torudbakken et al. | |
| 2006/0281630 A1 | 12/2006 | Bailey et al. | |
| 2006/0288130 A1 | 12/2006 | Madukkarumukumana | |
| 2007/0028087 A1 | 2/2007 | Yu et al. | |
| 2007/0073955 A1 | 3/2007 | Murray et al. | |
| 2007/0136554 A1 | 6/2007 | Biran et al. | |
| 2007/0168636 A1 | 7/2007 | Hummel et al. | |
| 2007/0168643 A1 | 7/2007 | Hummel et al. | |
| 2007/0168644 A1 | 7/2007 | Hummel et al. | |
| 2007/0168934 A1 | 7/2007 | Chandrasekharan et al. | |

(56) References Cited

U.S. PATENT DOCUMENTS

| | | |
|---|---|---|
| 2007/0186074 A1 | 8/2007 | Bradford et al. |
| 2007/0226386 A1 | 9/2007 | Sharp et al. |
| 2007/0234018 A1 | 10/2007 | Feiste |
| 2007/0245041 A1 | 10/2007 | Hua et al. |
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0098197 A1 | 4/2008 | Craddock et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0276775 A1 | 11/2009 | Brown et al. |
| 2009/0328035 A1 | 12/2009 | Ganguly |
| 2010/0005234 A1 | 1/2010 | Ganga et al. |
| 2010/0082855 A1 | 4/2010 | Accapadi et al. |
| 2010/0169528 A1 | 7/2010 | Kumar et al. |
| 2011/0153893 A1 | 6/2011 | Foong et al. |
| 2011/0202748 A1 | 8/2011 | Jacobi |
| 2011/0314260 A1 | 12/2011 | Greiner |
| 2011/0314263 A1 | 12/2011 | Greiner |
| 2011/0320637 A1 | 12/2011 | Craddock et al. |
| 2011/0320638 A1 | 12/2011 | Coneski et al. |
| 2011/0320643 A1 | 12/2011 | Brice et al. |
| 2011/0320644 A1 | 12/2011 | Craddock et al. |
| 2011/0320652 A1 | 12/2011 | Craddock et al. |
| 2011/0320653 A1 | 12/2011 | Lais |
| 2011/0320662 A1 | 12/2011 | Craddock et al. |
| 2011/0320663 A1 | 12/2011 | Brice et al. |
| 2011/0320664 A1 | 12/2011 | Belmar et al. |
| 2011/0320666 A1 | 12/2011 | Gregg |
| 2011/0320670 A1 | 12/2011 | Bayer |
| 2011/0320674 A1 | 12/2011 | Gregg |
| 2011/0320675 A1 | 12/2011 | Gregg |
| 2011/0320703 A1 | 12/2011 | Craddock |
| 2011/0320756 A1 | 12/2011 | Craddock et al. |
| 2011/0320757 A1 | 12/2011 | Craddock et al. |
| 2011/0320758 A1 | 12/2011 | Craddock et al. |
| 2011/0320759 A1 | 12/2011 | Craddock et al. |
| 2011/0320764 A1 | 12/2011 | Craddock et al. |
| 2011/0320772 A1 | 12/2011 | Craddock et al. |
| 2011/0320825 A1 | 12/2011 | Greiner |
| 2011/0320860 A1 | 12/2011 | Coneski et al. |
| 2011/0320861 A1 | 12/2011 | Bayer |
| 2011/0320887 A1 | 12/2011 | Craddock |
| 2011/0320892 A1 | 12/2011 | Check |
| 2011/0321060 A1 | 12/2011 | Craddock et al. |
| 2011/0321061 A1 | 12/2011 | Craddock et al. |
| 2011/0321158 A1 | 12/2011 | Craddock et al. |
| 2013/0067194 A1 | 3/2013 | Craddock et al. |

FOREIGN PATENT DOCUMENTS

| | | |
|---|---|---|
| EP | 0902355 A2 | 3/1999 |
| EP | 0955585 A2 | 11/1999 |
| EP | 1096376 A2 | 2/2001 |
| EP | 1489491 A1 | 12/2004 |
| JP | 57191826 A | 11/1982 |
| JP | 59081724 A | 5/1984 |
| JP | 362079557 A | 4/1987 |
| JP | 405053973 A | 3/1993 |
| JP | 5100996 A | 4/1993 |
| WO | WO9600940 A1 | 6/1995 |
| WO | WO9938074 A1 | 7/1999 |

OTHER PUBLICATIONS

Paulsen, Eric; "Local Memory Coaxes Top Speed from SCSI Masters," Electronic Design, v. 41, Apr. 15, 1993, pp. 76-6+.

Ganapathy, Narayanan; "General Purpose Operating System Support for Multiple Page Sizes," USENIX Annual Technical Conference (No. 98), 1998, pp. 91-104.

Talluri et al., "A New Page Table for 64-bit Address Spaces," ACM SIGOPS Operating Systems Review, vol. 29, Issue 5 (Dec. 1995), pp. 194-200.

"Large Page Support in the Linux Kernel," http://lwn.net/Articles/6969/ <retrieved on Jan. 26, 2010>.

Crawford, Catherine H. et al., "Accelerating Computing with the Cell Broadband Engine Processor," May 2008, CF '08, May 5-7, 2008, Ischia, Italy, pp. 3-11.

Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.

Swift, Michael M. et al., "Improving the Reliability of Commodity Operating Systems," ACM Transactions on Computer Systems, vol. 23, No. 1, Feb. 2005, pp. 77-110.

Xu, Min et al., "Towards a VMM-based Usage Control Framework for OS Kernel Integrity Protection," SACMAT '07, Jun. 20-22, 2007, Sophia Antipolis, France, pp. 71-80.

Huang, Wei et al., "A Case for High Performance Computing with Virtual Machines," ISC '06, Jun3 28 30, Carins, Queensland, Australia, pp. 125-134, Jun. 3, 2006.

Mysore, Shashidhar et al., "Understanding and Visualizing Full Systems with Data Flow Tomography," SPOLOS '08, Mar. 1-5, 2008, Seattle, Washington, USA, pp. 211-221.

"DMA Engines Bring Multicast to PCI Express Systems," http://electronicdesign.com, Aug. 13, 2009, 3 pages.

Vaidyanathan, K., et al., "Exploiting RDMA Operations for Providing Efficient Fine-Grained Resource Monitoring in Cluster-based Servers," 1-4244-0328—Jun. 2006, 10 pages.

"IBM Enhances the IBM eServer zSeries 990 Family of Servers," Hardware Announcement, Oct. 7, 2003, pp. 1-11.

"Intel® Virtualization Technology for Directed I/O," Intel® Technology Journal, vol. 10, Issue 3, Aug. 10, 2006.

"I/O Virtualization and AMD's IOMMU," AMD Developer Central, http://developer.amd.com/documentation/articles/pages/892006101.aspx, Aug. 9, 2006.

"z/Architecture Principles of Operation," IBM Publication No. SA22-7832-07, Feb. 2009.

"z/Vm: Running Guest Operating Systems," IBM Publication No. SC24-5997-02, Oct. 2001.

"z/Vm: General Information Manual," IBM Publication No. GC24-5991-05, May 2003.

Winwood, Simon, et al., "Multiple Page Size Support in the Linux Kernel", Proceedings of Ottawa Linux Symposium, 2002.

"z/Architecture Principles of Operation," Chapter 17, pp. 17-1-17-30, IBM Publication No. SA22-7832-07, Feb. 2009.

"Intel® Itanium® Architecture Software Developer's Manual," vol. 2, Rev. 2.2, Jan. 2006.

International Search Report and Written Opinion for PCT/EP2010/067041 dated Apr. 26, 2011.

International Search Report and Written Opinion for PCT/EP2010/067031 dated Apr. 26, 2011.

International Search Report and Written Opinion for PCT/EP2010/067034 dated May 18, 2011.

(56) References Cited

OTHER PUBLICATIONS

International Search Report and Written Opinion for PCT/EP2010/067023 dated Jun. 15, 2011.
International Search Report and Written Opinion for PCT/EP2010/067032 dated May 27, 2011.
International Search Report and Written Opinion for PCT/EP2010/067038 dated Jun. 15, 2011.
"Chapter 6: Configuration Space" in PCI-SIG: "PCI Local Bus Specification Revision 3.0", Feb. 2004, pp. 213-254.
Hennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
Gehringer, E. F., et al., "Virtual Memory Systems," CSC-506—Architecture of Parallel Computers Computer Science Department, College of Engineering, North Carolina, Dec. 31, 1999, XP002631523.
"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
McGee, H.T., "Technique for Resetting a Single Channel Path Under Operator Control in IBM System/370XA," IBM Technical Disclosure Bulletin, vol. 26, No. 10B, Mar. 1984.
"Decreased Latency Across PCI Express With I/O Virtualization Via a Hint Interface," IPCOM000185226D, Jul. 16, 2009, pp. 1-2.
Office Action for U.S. Appl. No. 12/821,171 dated Oct. 7, 2011.
Office Action for U.S. Appl. No. 12/821,182 dated Oct. 13, 2011.
Office Action for U.S. Appl. No. 12/821,184 dated Oct. 18, 2011.
Kamil et al., "Discussion #8 Topics: Paging, Multilevel Paging," Mar. 2004, P.P. 1-3.
Office Action for U.S. Appl. No. 12/821,172 dated Dec. 12, 2011.
Office Action for U.S. Appl. No. 12/821,185 dated Dec. 20, 2011.
Office Action for U.S. Appl. No. 12/821,174 dated Jan. 19, 2012.
Final Office Action for U.S. Appl. No. 12/821,184 dated Jan. 24, 2012.
Office Action for U.S. Appl. No. 12/821,193 dated Feb. 24, 2012.
"PCI Local Bus Specification Revision 3.0," Aug. 12, 2002, pp. 39, 44, 48-49, 58.
Office Action for U.S. Appl. No. 12/821,187 dated Feb. 28, 2012.
Final Office Action for U.S. Appl. No. 12/821,171 dated Mar. 29, 2012.
Office Action for U.S. Appl. No. 13/462,152 dated Aug. 28, 2012.
Office Action for U.S. Appl. No. 12/821,175 dated Sep. 17, 2012.
International Search Report and Written Opinion for PCT/EP2010/067029 dated Mar. 2, 2011.
"IBM System/390 I/O Call Reporting Process," IBM Technical Disclosure Bulletin, vol. 36, No. 1, Jan. 1993, pp. 164-169, XP000222812.
"Means for Channel Subsystem-Initiated Communication," IBM Technical Disclosure Bulletin, vol. 33, No. 12, May 1991, p. 169, XP000121623.
International Search Report and Written Opinion for PCT/EP2010/067028 dated Mar. 8, 2011.
International Search Report and Written Opinion for PCT/EP2010/067042 dated Apr. 28, 2011.
Communication Pursuant to Article 94(3) EPC for Application No. 10 776 350.0/2212 dated Oct. 31, 2012.
Communication Pursuant to Article 94(3) EPC for Application No. 10 784 272.6-1243 dated Feb. 6, 2013, pp. 1-7.
Office Action for U.S. Appl. No. 12/821,181 dated Mar. 26, 2013, pp. 1-37.
Notice of Allowance for U.S. Appl. No. 12/821,185 dated Apr. 11, 2013, pp. 1-16.
"Xen Wiki," http://wiki.xensource.com/xenwiki/VTdHowTo, 5 pages, Apr. 16, 2010.
International Search Report and Written Opinion for PCT/EP2010/067039 dated Feb. 25, 2011.
International Search Report and Written Opinion for PCT/EP2010/067036 dated Feb. 14, 2011.
International Search Report and Written Opinion for PCT/EP2010/067030 dated Feb. 7, 2011.
International Search Report and Written Opinion for PCT/EP2010/067020 dated Apr. 5, 2011.
International Search Report and Written Opinion for PCT/EP2010/067025 dated Apr. 13, 2011.
International Search Report and Written Opinion for PCT/EP2010/067024 dated Apr. 27, 2011.
International Search Report and Written Opinion for PCT/EP2010/067019 dated Apr. 26, 2011.
International Search Report and Written Opinion for PCT/EP2010/067021 dated Apr. 28, 2011.
International Search Report and Written Opinion for PCT/EP2010/067043 dated Apr. 21, 2011.
Communication Pursuant to Article 94(3) EPC for Application No. 10 776 345.0-1957, dated May 31, 2013, pp. 1-6.
Notice of Allowance for U.S. Appl. No. 13/462,152 dated Jun. 7, 2013, pp. 1-13.
Notice of Allowance for U.S. Appl. No. 12/821,175 dated Jun. 20, 2013, pp. 1-14.
Communication Pursuant to Article 94(3) EPC for Application No. 10 778 994.3-1960, dated Jul. 3, 2013, pp. 1-7.

* cited by examiner

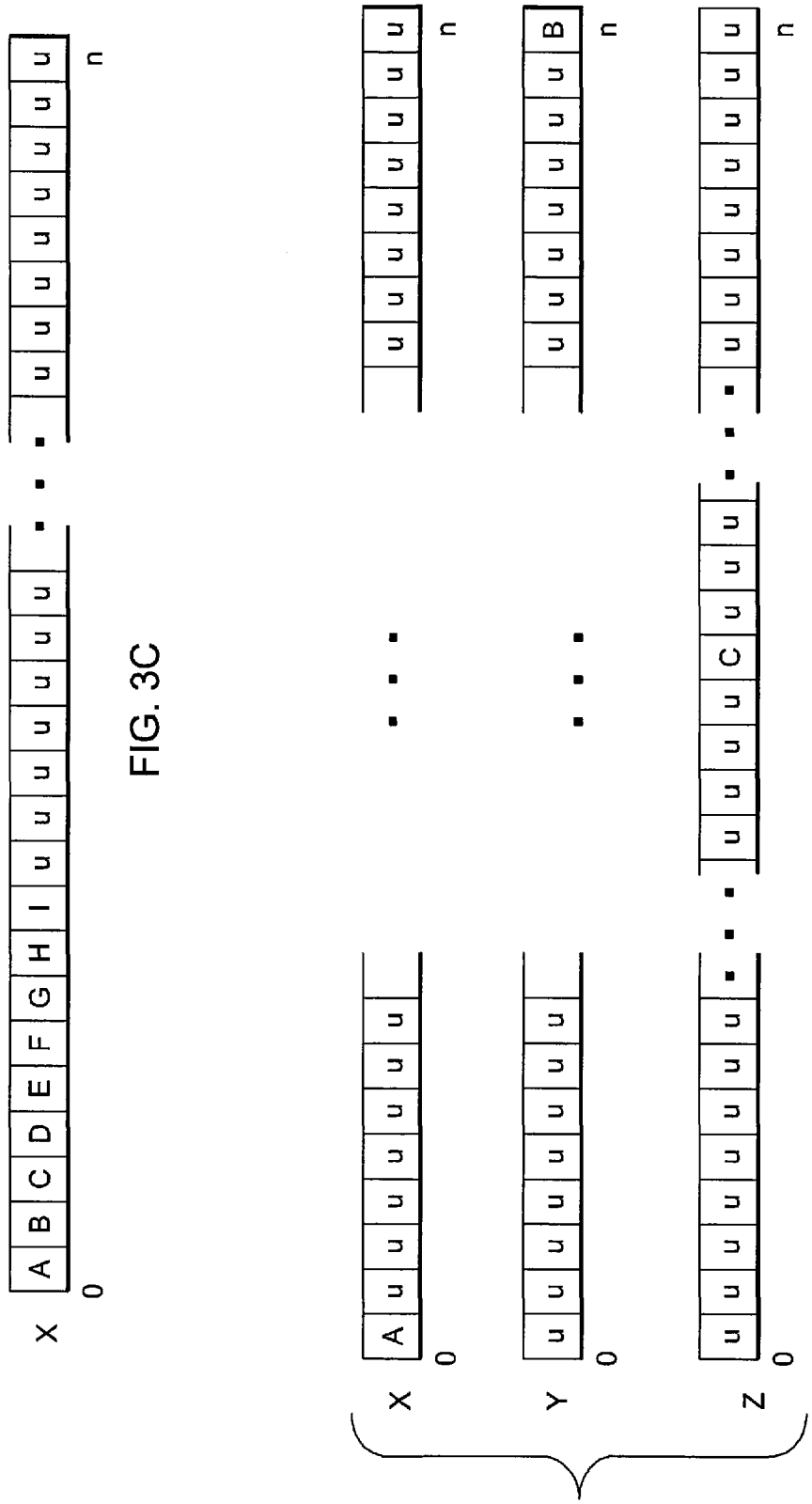

CONVERTING A MESSAGE SIGNALED INTERRUPTION INTO AN I/O ADAPTER EVENT NOTIFICATION

This application is a continuation of U.S. Ser. No. 12/821,175, entitled "CONVERTING A MESSAGE SIGNALED INTERRUPTION INTO AN I/O ADAPTER EVENT NOTIFICATION," filed Jun. 23, 2010, which is hereby incorporated herein by reference in its entirety.

BACKGROUND

This invention relates, in general, to interruption processing within a computing environment, and in particular, to handling interruptions generated by adapters of the computing environment.

Message signaled interruption (MSI) is a way for an adapter function, such as a Peripheral Component Interconnect (PCI) function, to generate a central processing unit (CPU) interruption to notify the operating system of the occurrence of an event or the presence of some status. MSI is an alternative to having a dedicated interruption pin on each device. When an adapter function is configured to use MSI, the function requests an interruption by performing an MSI write operation of a specified number of bytes of data to a special address. The combination of this special address and a unique data value is termed an MSI vector.

Some adapter functions support only one MSI vector; other adapter functions support multiple MSI vectors. For functions that support multiple MSI vectors, the same special address is used with different data values.

In many computing platforms, a device driver configures itself as the interrupt handler associated with an MSI vector. This effectively associates an MSI vector with an entry in a CPU interruption vector. Therefore, when an adapter function supports multiple MSI vectors and is configured to use multiple MSI vectors, it consumes a corresponding number of entries in the CPU interruption vector.

BRIEF SUMMARY

In accordance with an aspect of the present invention, a capability is provided to facilitate managing of interruption requests from adapters.

The shortcomings of the prior art are overcome and advantages are provided through the provision of a method of managing interruption requests in a computing environment. The method includes, for instance, based on executing a Modify PCI Function Controls (MPFC) instruction register interruptions operation that specifies a function handle of an adapter, specifying a location in system memory of an adapter interruption bit vector (AIBV) of the adapter, the AIBV included in an array of one or more AIBVs, and a location in system memory of an adapter interruption summary bit (AISB) of an AISB array; receiving from the adapter a request for interruption; and based on the received request, setting, by an input/output (I/O) hub coupled to the adapter, an indicator in the AIBV indicating a type of event from the adapter and setting the AISB indicating an indicator is set in the AIBV.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A-3B depict examples of allocations of adapter interruption bit vectors, in accordance with an aspect of the present invention;

FIGS. 3C-3D depict examples of allocations of adapter interruption summary bits, in accordance with an aspect of the present invention;

DETAILED DESCRIPTION

In accordance with an aspect of the present invention, a capability is provided for converting a message signaled interruption (MSI) request into an input/output (I/O) adapter event notification. The MSI is requested by an adapter and converted to an adapter event notification, in which one or more specific indicators are set and a request is made that an interruption be presented to an operating system (or other software, such as other programs, etc. As used herein, the term operating system includes operating system device drivers). In one particular example, each MSI request does not result in a request for interruption to the operating system, but instead, one interruption request encompasses a plurality of MSI requests.

As used herein, the term "adapter" includes any type of adapter (e.g., storage adapter, network adapter, processing adapter, cryptographic adapter, PCI adapter, other type of input/output adapter, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. Further, in the examples presented herein, adapter is used interchangeably with adapter function (e.g., PCI function) unless otherwise noted.

Figure 1:
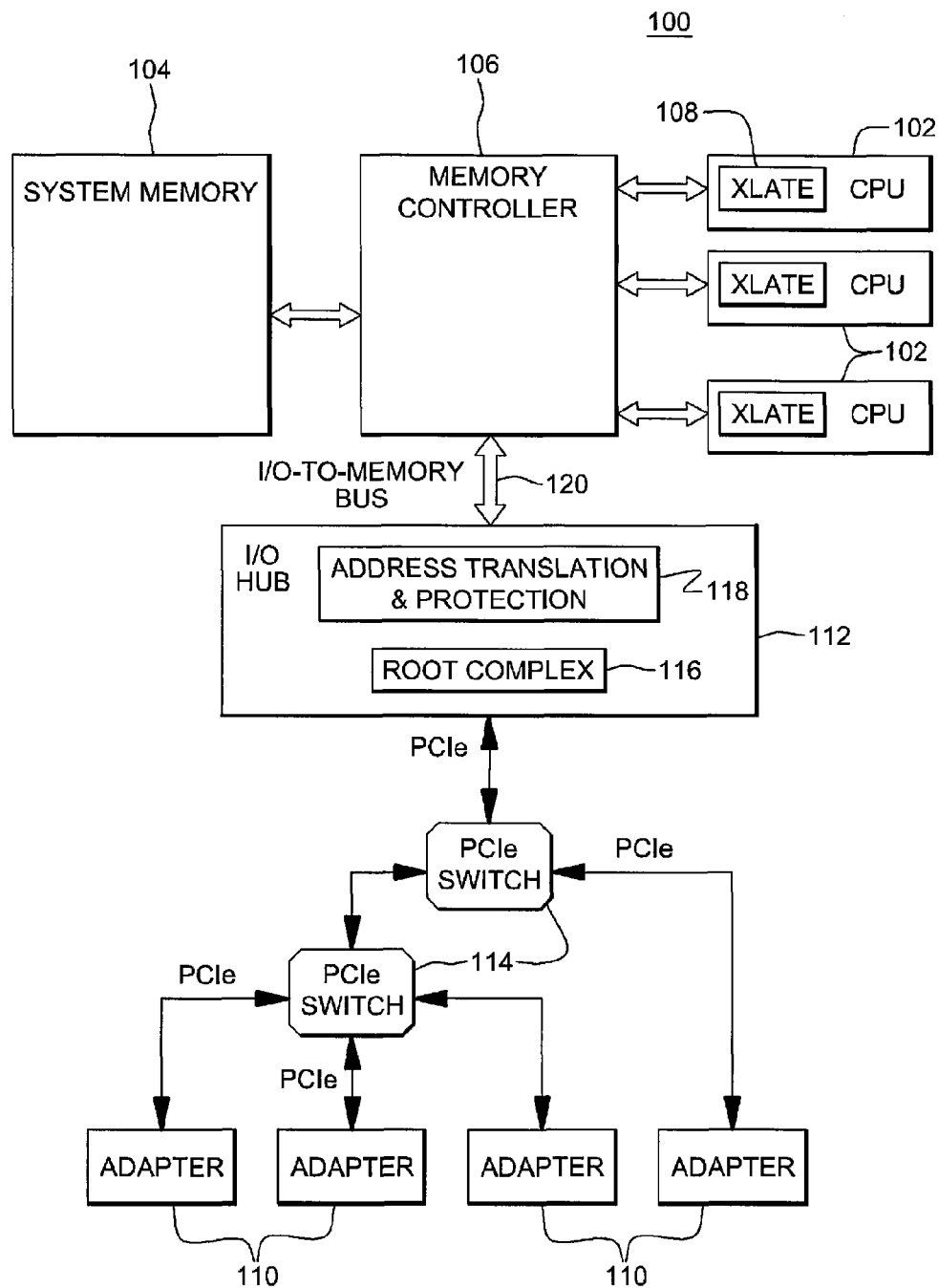
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that is routed to an input/output hub 112 (e.g., a PCI hub) via one or more switches (e.g., PCIe switches) 114. In one example, the input/output hub is comprised of hardware, including one or more state machines.

The input/output hub includes, for instance, a root complex 116 that receives the request from a switch. The request includes an input/output address that is used to perform a direct memory access (DMA) or to request a message signaled interruption (MSI), as examples. This address is provided to an address translation and protection unit 118 which accesses information used for either the DMA or the MSI request.

For a DMA operation, address translation and protection unit 118 may translate the address to an address usable to access system memory. Then, the request initiated from the adapter, including the translated address, is provided to memory controller 106 via, for instance, an I/O-to-memory bus 120. The memory controller performs its arbitration and forwards the request with the translated address to the system memory at the appropriate time.

Figure 2:
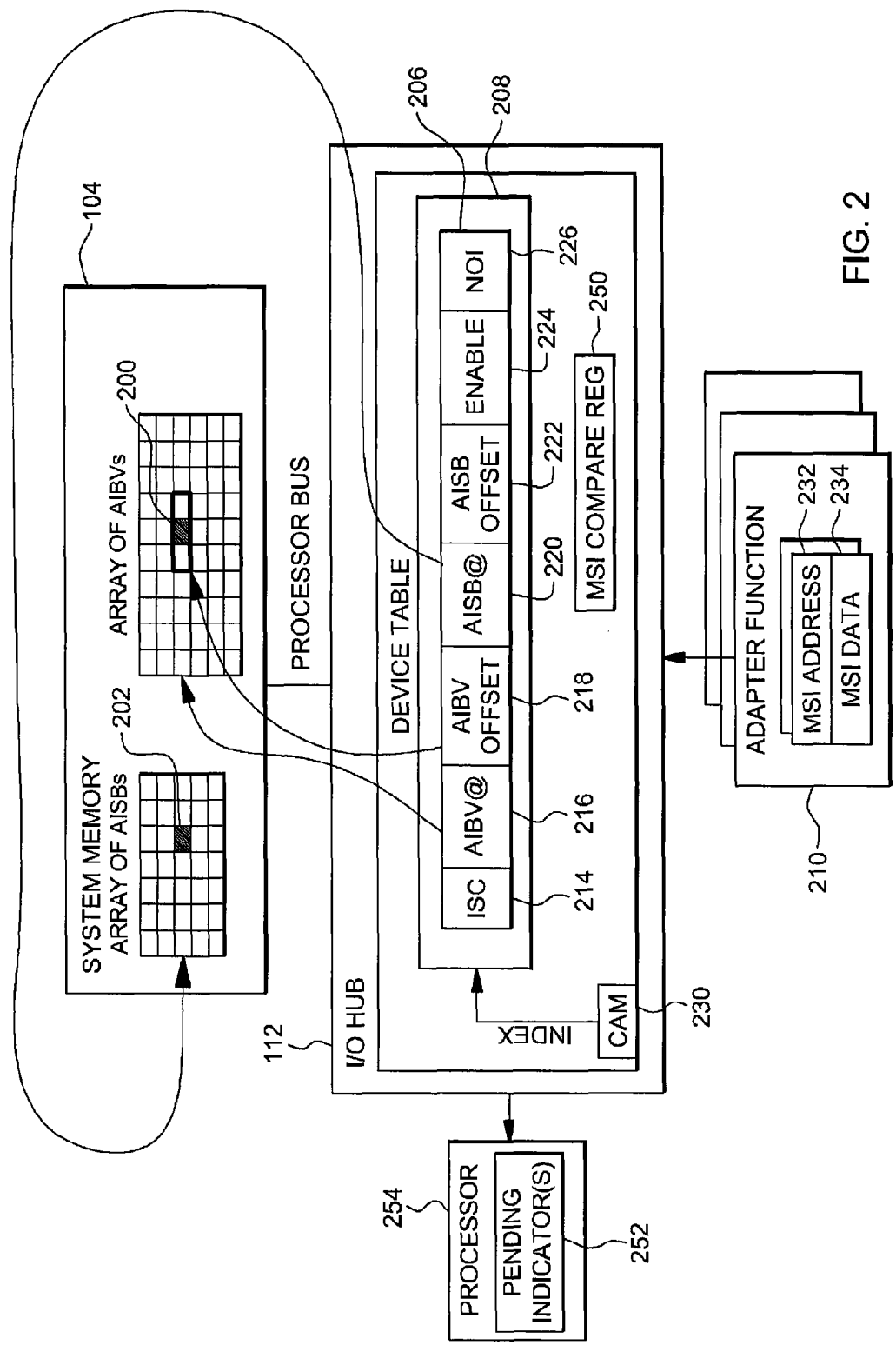
FIG. 2 depicts one embodiment of further details of system memory and the I/O hub of FIG. 1, in accordance with an aspect of the present invention.

For an MSI request, information in address translation and protection unit 118 is obtained to facilitate conversion of the MSI request to an I/O adapter event notification. Since the embodiments described herein relate to interrupt processing, further details regarding the I/O hub and system memory as they relate to interrupt processing are described with reference to FIG. 2. In FIG. 2, the memory controller is not shown, but may be used. The I/O hub may be coupled to system memory 104 and/or processor 254 directly or via a memory controller.

Referring to FIG. 2, in one example, system memory 104 includes one or more data structures usable in facilitating interruption processing. In this example, system memory 104 includes an adapter interruption bit vector (AIBV) 200 and an optional adapter interruption summary bit (AISB) 202 associated with a particular adapter. There may be an AIBV and a corresponding AISB for each adapter.

In one example, adapter interruption bit vector 200 is a single dimension array of one or more bits in main storage that are associated with an adapter (e.g., a PCI function). The bits in the adapter interruption bit vector represent MSI vector numbers. A bit that is set to one in an AIBV indicates a condition or type of event for the associated adapter. In the example of a PCI function, each bit in the associated AIBV corresponds to an MSI vector. Therefore, if a PCI function supports only one MSI vector, its AIBV includes a single bit; if a PCI function supports multiple MSI vectors, its AIBV includes one bit per MSI vector. In the example depicted in FIG. 2, the PCI function supports multiple MSI vectors (e.g., 3), and therefore, there are multiple bits (e.g., 3) in AIBV 200. Each bit corresponds to a particular event, e.g., bit 0 of the AIBV, when set to one, indicates a completed operation; bit 1 of the AIBV, when set to one, corresponds to an error event; etc. As shown, bit 1 is set in this example.

In one particular example, a command (e.g., a Modify PCI Function Controls command) is used to designate an AIBV for a PCI function. Specifically, the command is issued by the operating system and specifies the identity of the PCI function, the main storage location of the area that includes the AIBV, the offset from that location to the first bit of the AIBV, and the number of bits that comprise the AIBV. In particular, using this command, adapter interruption parameters are copied from a function information block that stores such information (e.g., obtained from initialization and/or configuration) into the adapter's device table entry (described below) and/or function table entry (described below).

The identity of the PCI function, in one example, is a function handle. A function handle includes, for instance, an enable indicator that indicates whether the PCI function handle is enabled; a PCI function number that identifies the function (this is a static identifier); and an instance number which indicates the particular instance of this function handle. For instance, each time the function handle is enabled, the instance number is incremented to provide a new instance number. The function handle is used to locate a function table entry in a function table that includes one or more entries. For instance, one or more bits of the function handle are used as an index into the function table to locate a particular function table entry. The function table entry includes information regarding its associated PCI function. For example, it may include various indicators regarding the status of its associated adapter function, and it may include one or more device table entry indices used to locate device table entries for this adapter function. (To the operating system, in one embodiment, the handle is simply an opaque identifier of the adapter.)

Figures 3A, 3B:
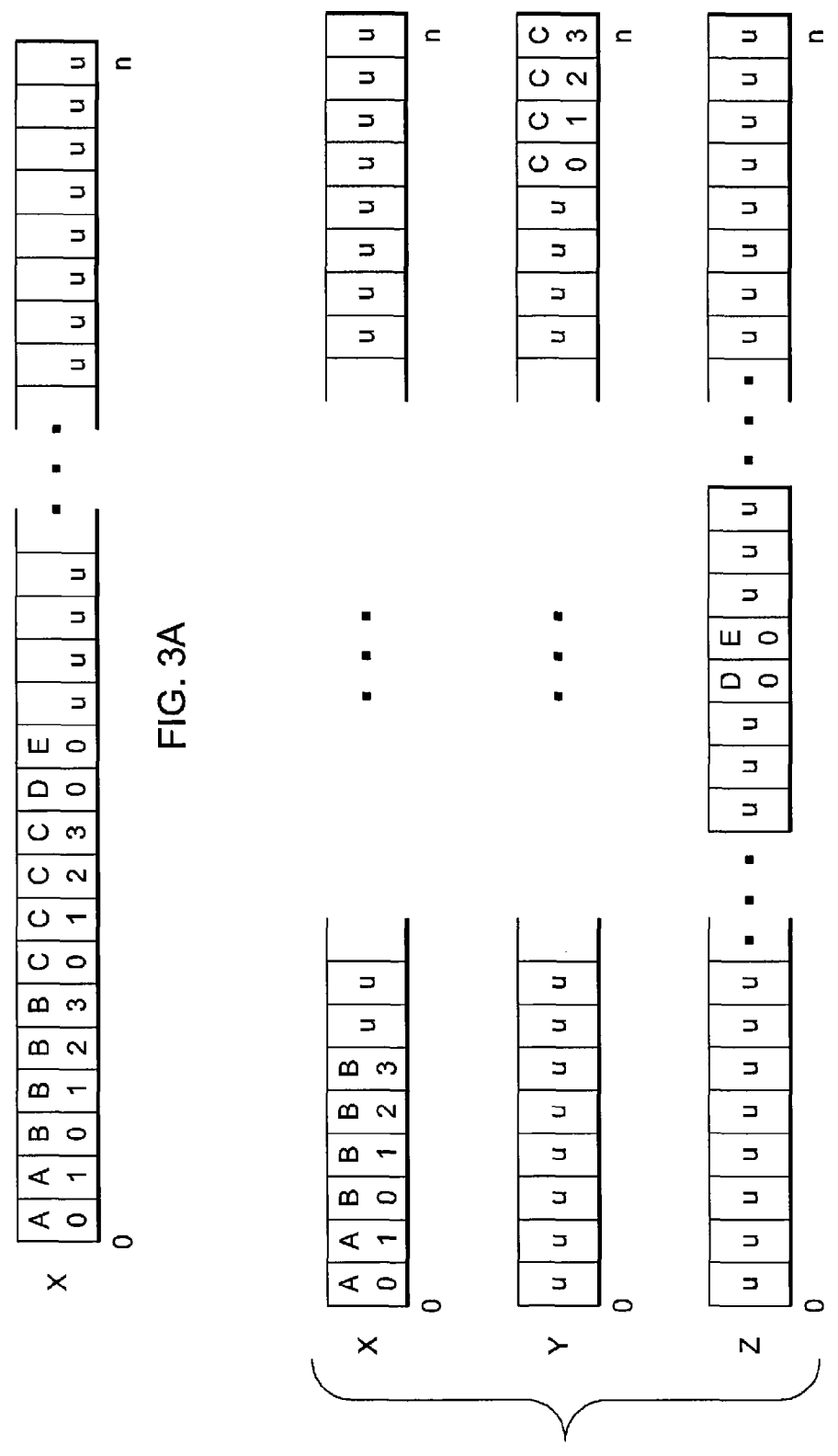

An AIBV may be allocated on any byte boundary and any bit boundary. This allows the operating system the flexibility to pack the AIBVs of multiple adapters into a contiguous range of bits and bytes. For instance, as shown in FIG. 3A, in one example, the operating system has designated a common storage area at location X to include five contiguous AIBVs. The adapter associated with each AIBV is identified by the letters A-E. The event that each AIBV bit represents for an adapter is further identified by the numbers 0-n. Unassigned bits are identified by the lowercase letter "u".

A further example is depicted in FIG. 3B. In this example, the operating system has designated three unique storage areas, at locations X, Y and Z to include the AIBVs for five I/O adapters. The storage at location X includes the AIBVs for adapters A and B, the storage at location Y includes the AIBV for only adapter C, and the storage at location Z includes the AIBVs for adapters D and E. The event that each AIBV bit represents for an I/O adapter is further identified by the numbers 0-n. Unassigned bits are identified by the letter "u".

Returning to FIG. 2, in addition to the AIBV, in this example, there is an AISB 202 for the adapter, which includes a single bit associated with the adapter. An AISB that is one indicates that one or more bits have been set to one in an AIBV associated with the AISB. The AISB is optional, and there may be one for each adapter, one for each selected adapter or one for a group of adapters.

In one particular implementation for PCI functions, a command (e.g., a Modify PCI Function Controls command) is used to designate an AISB for a PCI function. Specifically, the command is issued by the operating system and specifies the identity of the PCI function (e.g., the handle), the main storage location of the area that includes the AISB, the offset from that location to the AISB, and an adapter interruption summary notification enablement control indicating there is a summary bit.

An AISB may be allocated on any byte boundary and any bit boundary. This allows the operating system the flexibility to pack the AISBs of multiple adapters into a contiguous range of bits and bytes. In one example, as depicted in FIG. 3C, the operating system has designated a common storage area, at location X, to include nine contiguous AISBs. The adapter associated with each AISB is identified by the letters A-I. Unassigned bits are identified by the lowercase letter "u".

A further allocation example is depicted in FIG. 3D, where the operating system has designated three unique AISB storage locations, at locations X, Y and Z to include the AISBs of each of the three adapters. The adapters associated with each AISB is identified with the letters A-C. Unassigned bits are identified by the lowercase letter "u".

Further, the program may also assign a single AISB to multiple PCI functions. This associates multiple AIBVs with a single summary bit. Therefore, such an AISB that is one indicates that the operating system should scan multiple AIBVs.

Returning to FIG. 2, in one example, the AIBV and the AISB are pointed to by addresses located in a device table entry 206 of a device table 208 located in I/O hub 112. In one example, device table 208 is located within the address translation protection unit of the I/O hub.

Device table 208 includes one or more entries 206, each of which is assigned to a particular adapter function 210. A device table entry 206 includes a number of fields, which may be populated using, for instance, the above-mentioned commands. The values of one or more of the fields are based on policy and/or configuration. Examples of the fields include:

Interruption Subclass (ISC) 214: Indicates an interruption subclass for the interruption. The ISC identifies a maskable class of adapter interruptions that may be associated with a priority with which the operating system will process the interruption;

AIBV Address (@) 216: Provides, e.g., an absolute address of the beginning of the storage location that includes the AIBV for the particular adapter function assigned to this device table entry;

AIBV Offset 218: An offset into the main storage location to the beginning of the AIBV;

AISB Address (@) 220: Provides, e.g., an absolute address of the beginning of the storage location that includes the AISB for this PCI function, if the operating system has designated an AISB;

AISB Offset 222: An offset into the main storage location to the AISB;

Adapter Interruption Summary Notification Enablement Control (Enable) 224: This control indicates whether there is an AISB;

Number of Interruptions (NOI) 226: Indicates the maximum number of MSI vectors allowed for this PCI function, with zero indicating none allowed.

In other embodiments, the DTE may include more, less or different information.

In one embodiment, the device table entry to be used for a particular interruption request by an adapter is located using, for instance, a requestor identifier (RID) (and/or a portion of the address) located in a request issued by the adapter (e.g., PCI function 210). The requestor ID (e.g., a 16-bit value specifying, for instance, a bus number, device number and function number) is included in the request, as well as an address to be used for the interrupt. The request, including the RID and the address, are provided to, e.g., a contents addressable memory (CAM 230) via, e.g., a switch, and the contents addressable memory is used to provide an index value. For instance, the CAM includes multiple entries, with each entry corresponding to an index into the device table. Each CAM entry includes the value of a RID. If, for instance, the received RID matches the value contained in an entry in the CAM, the corresponding device table index is used to locate the device table entry. That is, the output of the CAM is used to index into device table 208. If there is no match, the received packet is discarded. (In other embodiments, a CAM or other lookup is not needed and the RID is used as the index.) The located DTE is used in processing an interrupt request, as described herein.

To request an interruption, adapter function 210 sends a packet to the I/O hub. This packet has an MSI address 232 and associated data 234. The I/O hub compares at least a part of the received address to a value in a MSI compare register 250. If there is a match, then an interruption (e.g., MSI) is being requested, as opposed to a DMA operation. The reason for the request (i.e., type of event that has occurred) is indicated in associated data 234. For example, one or more of the low order bits of the data are used to specify a particular interrupt vector (i.e., an MSI vector) that indicates the reason (event).

In accordance with an aspect of the present invention, the interruption request received from the adapter is converted into an I/O adapter event notification. That is, one or more indicators (e.g., one or more AIBVs and optionally an AISB) are set and an interruption to the operating system is requested, if one is not already pending. In one embodiment, multiple interruption requests (e.g., MSIs) from one or more adapters are coalesced into a single interruption to the operating system but with respective AIBV and AISB indications. For instance, if the I/O hub has already received an MSI request, has, in turn, provided an interruption request to a processor, and that interruption is still pending (e.g., for one reason or another, the interruption has not been presented to the operating system (e.g., interrupts are disabled)), then if the hub receives one or more other MSIs, it does not request additional interrupts. The one interruption replaces and represents the plurality of MSI requests. However, one or more AIBVs and optionally one or more AISBs are set.

Figure 5:
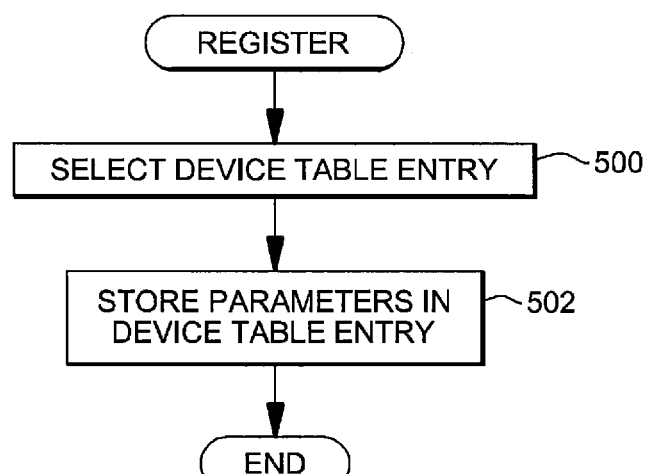
FIG. 5 depicts one embodiment of the logic to perform registration to enable conversion of a message signaled interruption (MSI) into an I/O adapter event notification, in accordance with an aspect of the present invention.
Figure 6A:
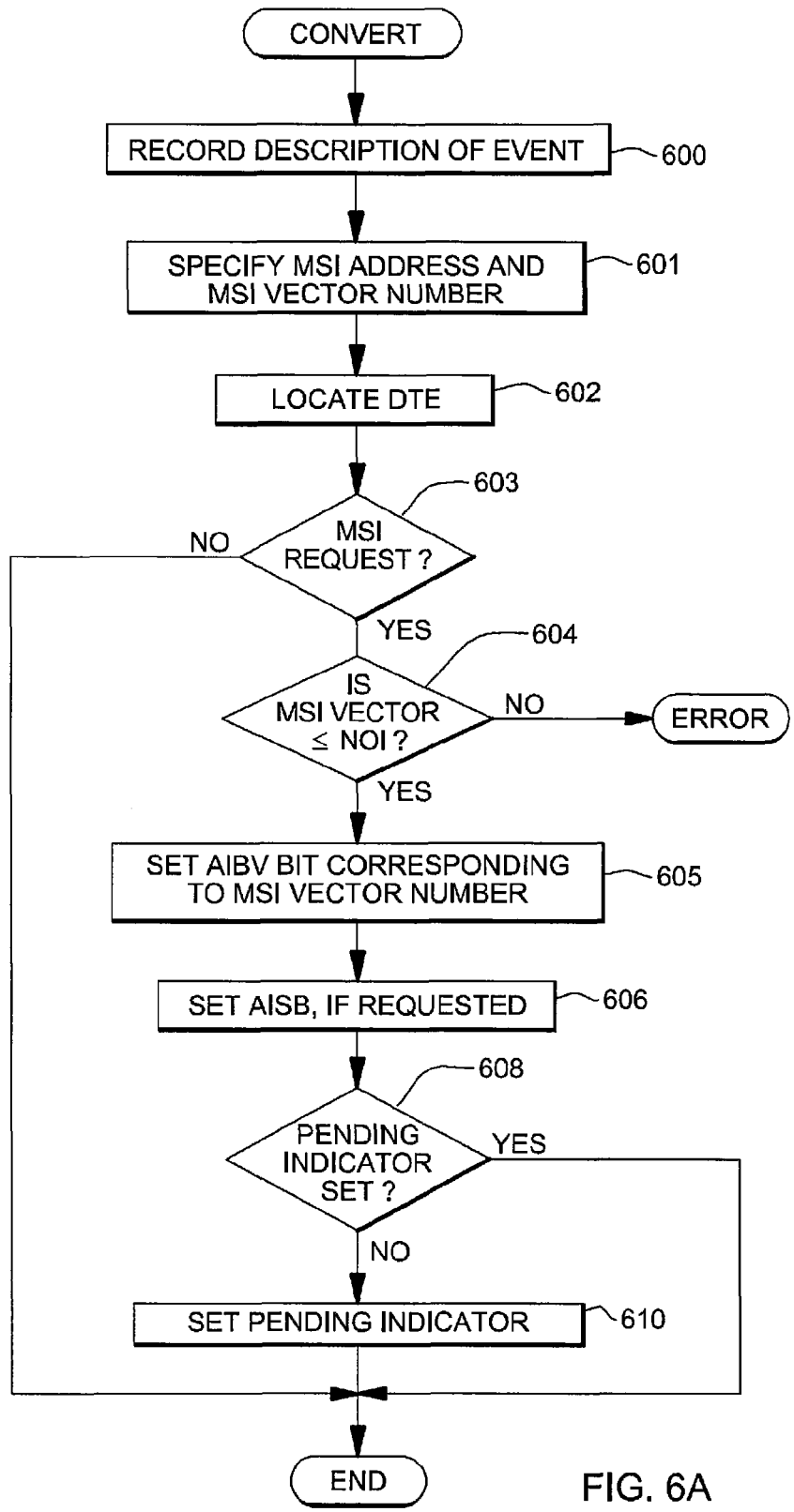
FIG. 6A depicts one embodiment of the logic to convert an MSI request to an I/O adapter event notification, in accordance with an aspect of the present invention.

Further details regarding converting an MSI (or other adapter interruption request) to an I/O adapter event notification are described below with reference to FIGS. 4-6B. Particularly, FIG. 4 describes various initialization to be performed; FIG. 5 describes a registration process; FIG. 6A describes logic to convert an MSI to an adapter event notification; and FIG. 6B describes logic to present the I/O adapter event notification to the operating system.

Figure 4:
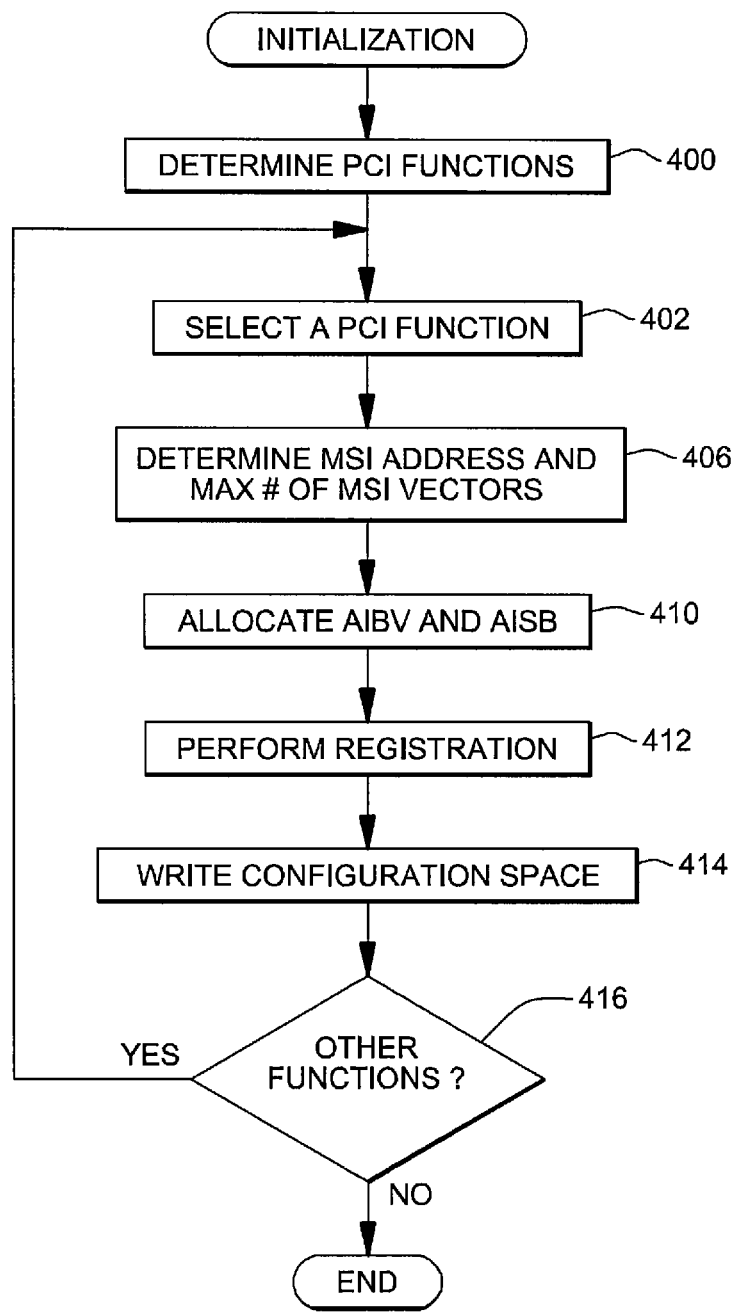
FIG. 4 depicts one embodiment of an overview of the logic to be performed during initialization to configure an adapter function for I/O adapter event notification, in accordance with an aspect of the present invention.

Referring to FIG. 4, in one example, to convert an MSI request to an I/O adapter event notification certain initialization is performed. During initialization, the operating system performs a number of steps to configure an adapter for adapter event notification via an MSI request. In this example, it is a PCI function being configured; although, in other embodiments, it can be other adapters, including other types of adapter functions.

Initially, in one embodiment, a determination is made as to the PCI functions in the configuration, STEP 400. In one example, a command (e.g., a Query List command) issued by the operating system is used to obtain a list of the PCI functions assigned to the requesting configuration (e.g., assigned to a particular operating system). This information is obtained from a configuration data structure that maintains this information.

Next, one of the PCI functions in the list is selected, STEP 402, and a determination is made as to the MSI address to be used for the PCI function and the number of MSI vectors supported by the PCI function. The MSI address is determined based on the characteristics of the I/O hub and the system in which it is installed. The number of MSI vectors supported is based on policy and is configurable.

Additionally, the AIBV is allocated, as well as the AISB, if any, STEP 410. In one example, the operating system determines the location of the AIBV to allow for efficient processing of one or more adapters, typically based on the class of adapter. For example, the AIBVs for storage adapters may be located adjacent to each other. The AIBV and the AISB are allocated and cleared to zeros, and a register adapter interruption operation is specified (e.g., using a Modify PCI Function Controls instruction). This operation registers the AIBV, the AISB, the ISC, the number of interruptions (MSI vectors), and the adapter interruption summary notification enablement control, as described in further detail below, STEP 412. Thereafter, the PCI function's configuration space is read/written, STEP 414. Specifically, the MSI address and MSI vector count are written consistent with the previous registration.

Thereafter, a determination is made as to whether there are additional functions in the list, INQUIRY 416. If so, processing continues with STEP 402. Otherwise, initialization processing is complete.

Further details regarding the registration of various parameters are described with reference to FIG. 5. Initially, the device table entry (DTE) to correspond to the PCI function for which initialization is being performed is selected. This selection is performed by, for instance, the managing firmware that selects an available DTE from the device table. Thereafter, the various parameters are stored in the device table entry, STEP 502. For instance, the ISC, the AIBV address, the AIBV offset, the AISB address, the AISB offset, the enablement control, and the number of interruptions (NOI) are set to values obtained from configuring the function. This completes the registration process.

As used herein, firmware includes, e.g., the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

During operation, when a PCI function wishes to generate an MSI, it typically makes some information available to the operating system that describes the condition. This causes one or more steps to occur in order to convert the PCI function's MSI request to an I/O adapter event notification to the operating system. This is described with reference to FIG. 6A.

Referring to FIG. 6A, initially, a description of the event for which the interruption is requested is recorded, STEP 600. For instance, the PCI function records a description of the event in one or more adapter-specific event-description-recording structures stored, for instance, in system memory. This may include recording the type of event, as well as recording additional information. Additionally, a request is initiated by the PCI function specifying the MSI address and the MSI vector number, as well as a requestor ID, STEP 601. This request is received by the I/O hub, and responsive to receiving the request, the requestor ID in the request is used to locate the device table entry for the PCI function, STEP 602. The I/O hub compares at least a portion of the address in the request with the value in the MSI compare register, INQUIRY 603. If they are unequal, an MSI is not being requested. However, if they are equal, then an MSI address has been specified, and thus, an MSI has been requested, instead of a direct memory access operation.

Thereafter, a determination is made as to whether the MSI vector number specified in the request is less than or equal to the number of interruptions (NOI) allowed for this function, INQUIRY 604. If the MSI vector number is greater than NOI, an error is indicated. Otherwise, the I/O hub issues a set bit function to set the appropriate AIBV bit in storage. The appropriate bit is determined by adding the MSI vector number to the AIBV offset specified in the device table entry and displacing this number of bits from the AIBV address specified in the device table entry, STEP 605. Moreover, if an AISB has been designated, the I/O hub uses a set bit function to set the AISB, using the AISB address and the AISB offset in the device table entry, STEP 606.

Next, in one embodiment, a determination is made (e.g., by the CPU or the I/O hub) as to whether an interruption request is already pending. To make this determination, a pending indicator is used. For instance, a pending indicator 252 (FIG. 2) stored in memory of a processor 254, which is accessible to processors of the computing environment that may process the interrupt (e.g., CPUs 102 of FIG. 1), is checked, INQUIRY 608. If it is not set, then it is set (e.g., to 1), STEP 610. If it is already set, processing is complete and another interruption request is not requested. Therefore, subsequent interruption requests are encompassed by the one request already pending.

In one particular example, there may be one pending indicator per interruption subclass, and therefore, the pending indicator of the interruption subclass assigned to the requesting function is the indicator that is checked.

Figure 6B:
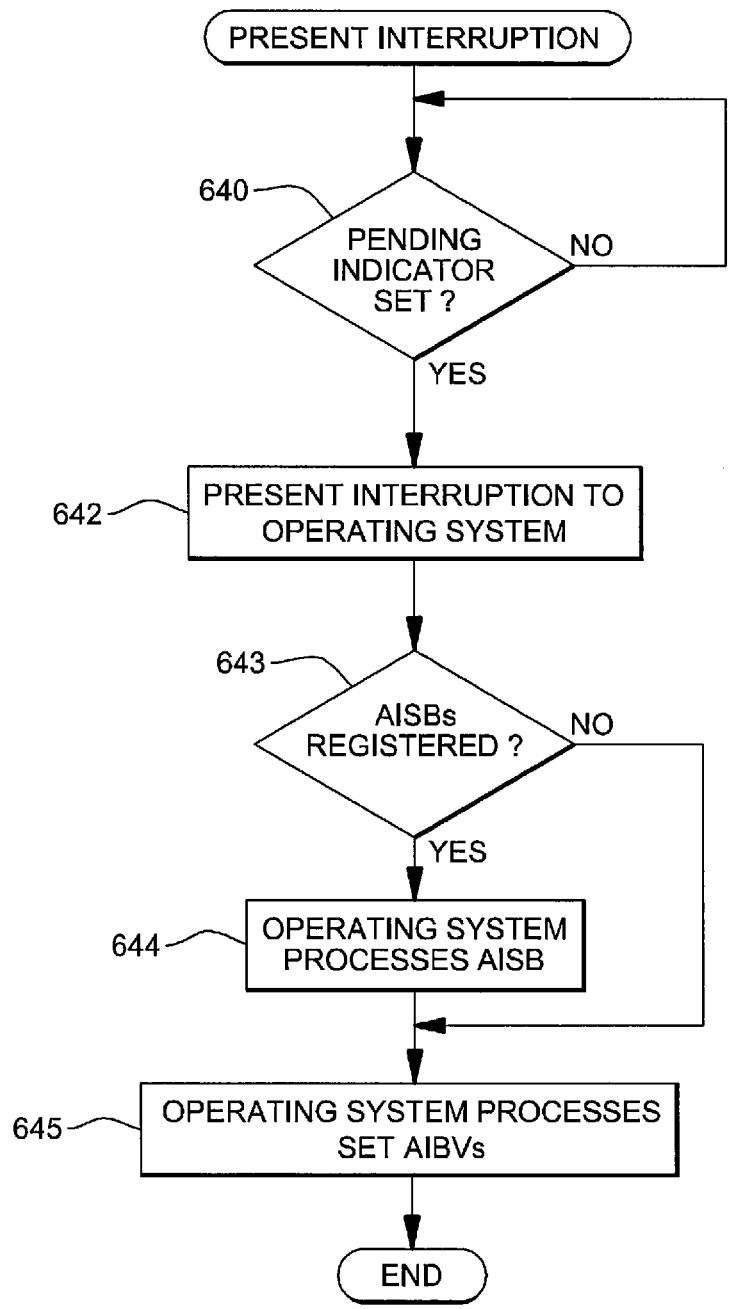
FIG. 6B depicts one embodiment of the logic to present the I/O adapter event notification to an operating system, in accordance with an aspect of the present invention.

Asynchronously, as depicted in FIG. 6B, one or more processors check the pending indicator, INQUIRY 640. In particular, each processor enabled for the ISC (and zone in another embodiment) polls on the indicator for the ISC when, for instance, interrupts are enabled for that processor (i.e., for its operating system). If one of the processors determines that the indicator is set, it arbitrates with the other processors enabled for the same ISC (and zone in another embodiment) to present the interruption, STEP 642. Returning to INQUIRY 640, if the pending indicator is not set, the processors enabled for the ISC continue to poll for a set indicator.

Responsive to the operating system being presented with the interruption, STEP 642, the operating system determines whether any AISBs are registered, INQUIRY 643. If not, the operating system processes the set AIBVs, as described below, STEP 645. Otherwise, the operating system processes any set AISBs and AIBVs, STEPs 644, 645. For example, it checks whether any AISBs are set. If so, it uses the AISB to determine the location of one or more AIBVs. For example, the operating system remembers the locations of the AISBs and AIBVs. Furthermore, it remembers for which adapter each AISB and AIBV represents. Therefore, it may maintain a form of a control block or other data structure that includes the locations of AISBs and AIBVs and the association between AISBs, AIBVs and adapter ID. It uses this control block to facilitate the location of an AIBV based on its associated AISB. In a further embodiment, an AISB is not used. In that situation, the control block is used to locate the particular AIBV.

Responsive to locating the one or more AIBVs, the operating system scans the AIBVs and processes any set AIBVs. It processes the interruption in a manner consistent with the presented event (e.g., provides status). For example, with a storage adapter, an event may indicate that an operation has completed. This results in the operating system checking status stored by the adapter to see if the operation completed successfully and also details of the operation. In the case of a storage read, this is an indication that the data read from the adapter is now available in system memory and can be processed.

In one embodiment, if during operation of the conversion, an error is detected, an attention is generated to the system firmware, instead of converting the MSI request to an adapter event notification.

Figure 7A:
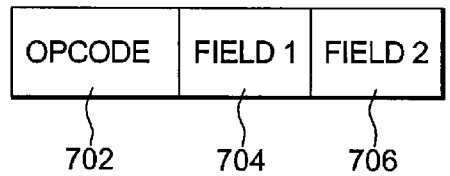
FIG. 7A depicts one embodiment of a Modify PCI Function Controls instruction used in accordance with an aspect of the present invention.

Further details regarding the Modify PCI Function Controls instruction used to register adapter interruptions is described herein. Referring to FIG. 7A, a Modify PCI Function Controls instruction 700 includes, for instance, an op code 702 indicating the Modify PCI Function Controls instruction; a first field 704 specifying a location at which various information is included regarding the adapter function for which the operational parameters are being established; and a second field 706 specifying a location from which a PCI function information block (FIB) is fetched. The contents of the locations designated by Fields 1 and 2 are further described below.

Figure 7B:
FIG. 7B depicts one embodiment of a field used by the Modify PCI Function Controls instruction of FIG. 7A, in accordance with an aspect of the present invention.

In one embodiment, Field 1 designates a general register that includes various information. As shown in FIG. 7B, the contents of the register include, for instance, a function handle 710 that identifies the handle of the adapter function on behalf of which the modify instruction is being performed; an address space 712 designating an address space in system memory associated with the adapter function designated by the function handle; an operation control 714 which specifies the operation to be performed for the adapter function; and status 716 which provides status regarding the instruction when the instruction completes with a predefined code.

In one embodiment, the function handle includes, for instance, an enable indicator indicating whether the handle is enabled, a function number that identifies an adapter function (this is a static identifier and may be used to index into a function table); and an instance number specifying the particular instance of this function handle. There is one function handle for each adapter function, and it is used to locate a function table entry (FTE) within the function table. Each function table entry includes operational parameters and/or other information associated with its adapter function. As one example, a function table entry includes:

Instance Number: This field indicates a particular instance of the adapter function handle associated with the function table entry;

Device Table Entry (DTE) Index 1 ... n: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.

Busy Indicator: This field indicates whether the adapter function is busy;

Permanent Error State Indicator: This field indicates whether the adapter function is in a permanent error state;

Recovery Initiated Indicator: This field indicates whether recovery has been initiated for the adapter function;

Permission Indicator: This field indicates whether the operating system trying to control the adapter function has authority to do so;

Enable Indicator: This field indicates whether the adapter function is enabled (e.g., 1=enabled, 0=disabled);

Requestor Identifier (RID): This is an identifier of the adapter function, and includes, for instance, a bus number, a device number and a function number.

In one example, this field is used for accesses of a configuration space of the adapter function. (Memory of an adapter may be defined as address spaces, including, for instance, a configuration space, an I/O space, and/or one or more memory spaces.) In one example, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.

Base Address Register (BAR) (1 to n): This field includes a plurality of unsigned integers, designated as $BAR_0$-$BAR_n$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;

In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;

Size 1 ... n: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.

1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.
3. When a BAR field represents a 64-bit memory address space,
   a. The $BAR_n$ field represents the least significant address bits.
   b. The next consecutive $BAR_{n+1}$ field represents the most significant address bits.
   c. The corresponding $SIZE_n$ field is non-zero and represents the size of the address space.
   d. The corresponding $SIZE_{n+1}$ field is not meaningful and is stored as zero.

Internal Routing Information: This information is used to perform particular routing to the adapter. It includes, for instance, node, processor chip, and hub addressing information, as examples.

Status Indication: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). Other fields may be set based on configuration, initialization, and/or events. In other embodiments, the function table entry may include more, less or different information. The information included may depend on the operations supported by or enabled for the adapter function.

Figure 7C:
FIG. 7C depicts one embodiment of another field used by the Modify PCI Function Controls instruction of FIG. 7A, in accordance with an aspect of the present invention.

Referring to FIG. 7C, in one example, Field 2 designates a logical address 720 of a PCI function information block (FIB), which includes information regarding an associated adapter function. The function information block is used to update a device table entry and/or function table entry (or other location) associated with the adapter function. The information is stored in the FIB during initialization and/or configuration of the adapter, and/or responsive to particular events.

Figure 7D:
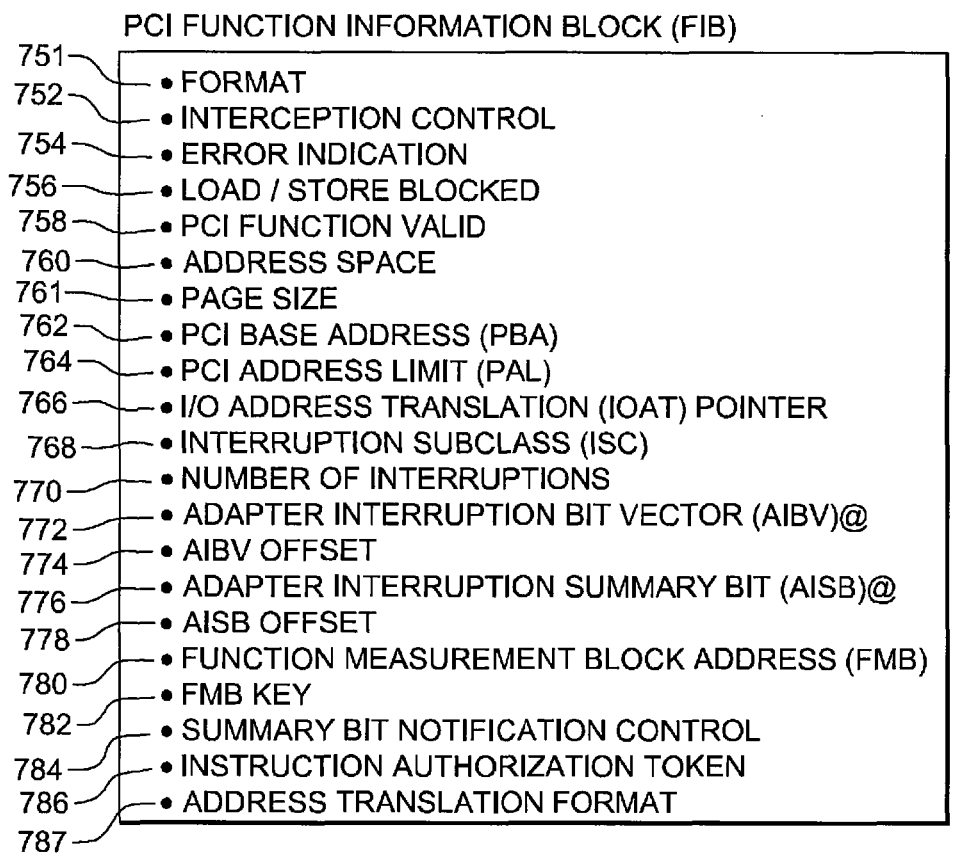
FIG. 7D depicts one embodiment of the contents of a function information block (FIB) used in accordance with an aspect of the present invention.

Further details regarding a function information block (FIB) are described with reference to FIG. 7D. In one embodiment, a function information block 750 includes the following fields:

Format 751: This field specifies the format of the FIB.

Interception Control 752: This field is used to indicate whether guest execution of specific instructions by a pageable mode guest results in instruction interception;

Error Indication 754: This field includes the error state indication for direct memory access and adapter interruptions. When the bit is set (e.g., 1), one or more errors have been detected while performing direct memory access or adapter interruption for the adapter function;

Load/Store Blocked 756: This field indicates whether load/store operations are blocked;

PCI Function Valid 758: This field includes an enablement control for the adapter function. When the bit is set (e.g., 1), the adapter function is considered to be enabled for I/O operations;

Address Space Registered 760: This field includes a direct memory access enablement control for an adapter function. When the field is set (e.g., 1) direct memory access is enabled;

Page Size 761: This field indicates the size of the page or other unit of memory to be accessed by a DMA memory access;

PCI Base Address (PBA) 762: This field is a base address for an address space in system memory assigned to the adapter function. It represents the lowest virtual address that an adapter function is allowed to use for direct memory access to the specified DMA address space;

PCI Address Limit (PAL) 764: This field represents the highest virtual address that an adapter function is allowed to access within the specified DMA address space;

Input/Output Address Translation Pointer (IOAT) 766: The input/output address translation pointer designates the first of any translation tables used by a PCI virtual address translation, or it may directly designate the absolute address of a frame of storage that is the result of translation;

Interruption Subclass (ISC) 768: This field includes the interruption subclass used to present adapter interruptions for the adapter function;

Number of Interruptions (NOI) 770: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 772: This field specifies an address of the adapter interruption bit vector for the adapter function. This vector is used in interrupt processing;

Adapter Interruption Bit Vector Offset 774: This field specifies the offset of the first adapter interruption bit vector bit for the adapter function;

Adapter Interruption Summary Bit Address (AISB) 776: This field provides an address designating the adapter interruption summary bit, which is optionally used in interrupt processing;

Adapter Interruption Summary Bit Offset 778: This field provides the offset into the adapter interruption summary bit vector;

Function Measurement Block (FMB) Address 780: This field provides an address of a function measurement block used to collect measurements regarding the adapter function;

Function Measurement Block Key 782: This field includes an access key to access the function measurement block;

Summary Bit Notification Control 784: This field indicates whether there is a summary bit vector being used;

Instruction Authorization Token 786: This field is used to determine whether a pageable storage mode guest is authorized to execute PCI instructions without host intervention.

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE; and Address Translation Format 787: This field indicates a selected format for address translation of the highest level translation table to be used in translation (e.g., segment table, region 3rd, etc).

The function information block designated in the Modify PCI Function Controls instruction is used to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 8. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 8:
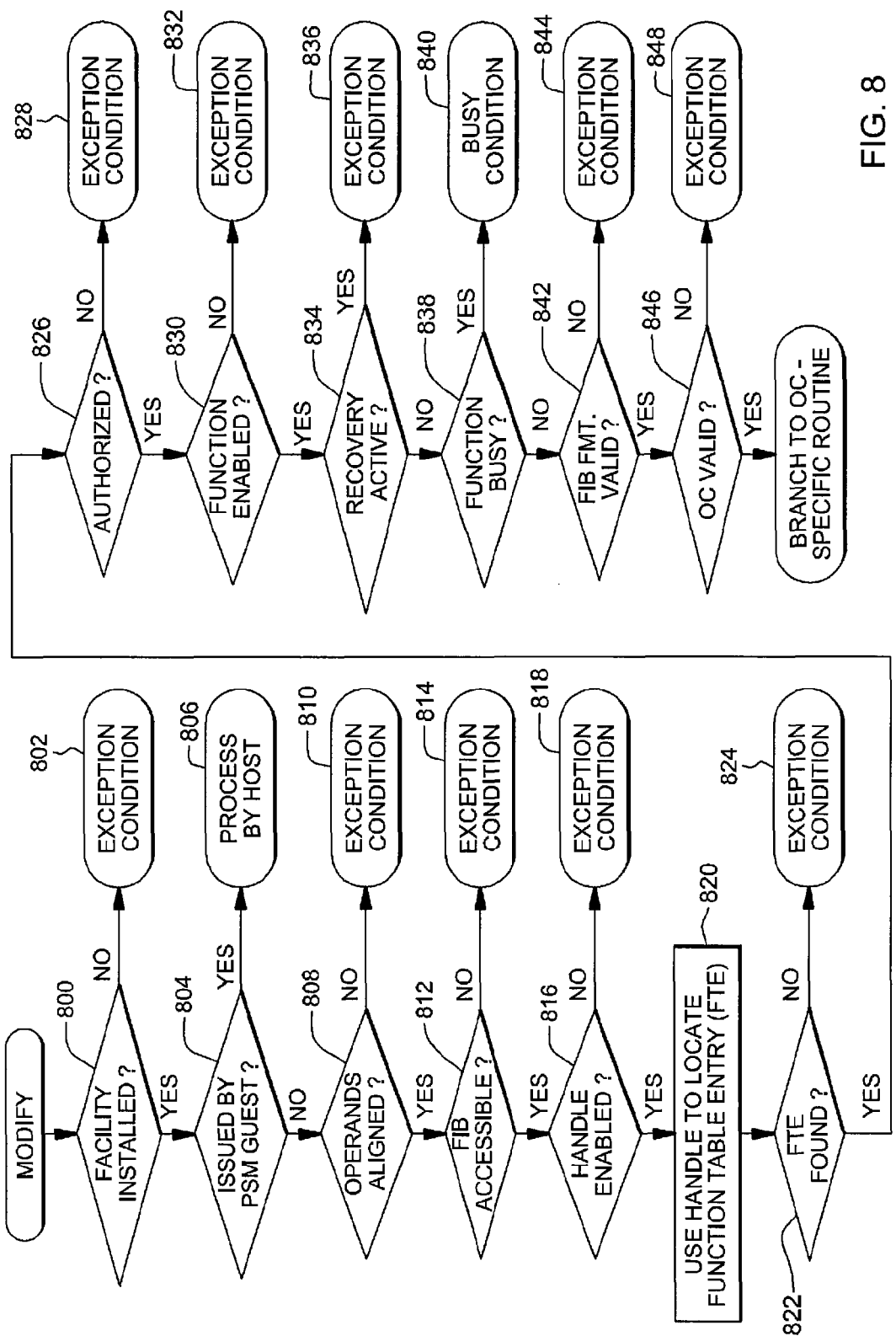
FIG. 8 depicts one embodiment of an overview of the logic of the Modify PCI Function Controls instruction, in accordance with an aspect of the present invention.

Referring to FIG. 8, initially, a determination is made as to whether the facility allowing for a Modify PCI Function Controls instruction is installed, INQUIRY 800. This determination is made by, for instance, checking an indicator stored in, for instance, a control block. If the facility is not installed, an exception condition is provided, STEP 802. Otherwise, a determination is made as to whether the instruction was issued by a pageable storage mode guest (or other guest), INQUIRY 804. If yes, the host operating system will emulate the operation for that guest, STEP 806.

Otherwise, a determination is made as to whether one or more of the operands are aligned, INQUIRY 808. For instance, a determination is made as to whether the address of the function information block is on a double word boundary. In one example, this is optional. If the operands are not aligned, then an exception condition is provided, STEP 810. Otherwise, a determination is made as to whether the function information block is accessible, INQUIRY 812. If not, then an exception condition is provided, STEP 814. Otherwise, a determination is made as to whether the handle provided in the operands of the Modify PCI Function Controls instruction is enabled, INQUIRY 816. In one example, this determination is made by checking an enable indicator in the handle. If the handle is not enabled, then an exception condition is provided, STEP 818.

If the handle is enabled, then the handle is used to locate a function table entry, STEP 820. That is, at least a portion of the handle is used as an index into the function table to locate the function table entry corresponding to the adapter function for which operational parameters are to be established.

A determination is made as to whether the function table entry was found, INQUIRY 822. If not, then an exception condition is provided, STEP 824. Otherwise, if the configuration issuing the instruction is a guest, INQUIRY 826, then an exception condition (e.g., interception to the host) is provided, STEP 828. This inquiry may be ignored if the configuration is not a guest or other authorizations may be checked, if designated.

A determination is then made as to whether the function is enabled, INQUIRY 830. In one example, this determination is made by checking an enable indicator in the function table entry. If it is not enabled, then an exception condition is provided, STEP 832.

If the function is enabled, then a determination is made as to whether recovery is active, INQUIRY 834. If recovery is active as determined by a recovery indicator in the function table entry, then an exception condition is provided, STEP 836. However, if recovery is not active, then a further determination is made as to whether the function is busy, INQUIRY 838. This determination is made by checking the busy indicator in the function table entry. If the function is busy, then a busy condition is provided, STEP 840. With the busy condition, the instruction can be retried, instead of dropped.

If the function is not busy, then a further determination is made as to whether the function information block format is valid, INQUIRY 842. For instance, the format field of the FIB is checked to determine if this format is supported by the system. If it is invalid, then an exception condition is provided, STEP 844. If the function information block format is valid, then a further determination is made as to whether the operation control specified in the operands of the instruction is valid, INQUIRY 846. That is, is the operation control one of the specified operation controls for this instruction. If it is invalid, then an exception condition is provided, STEP 848. However, if the operation control is valid, then processing continues with the specific operation control being specified.

In one example, the operation control is a register adapter interruptions operation, which is used for controlling adapter interruptions. Responsive to this operation control, the adapter function parameters relevant to adapter interruptions are set in the device table entry based on the appropriate contents of the function information block.

One embodiment of the logic associated with this operation is described with reference to FIG. 9. As one example, the operands for this operation, which are obtained from the function information block, include for instance: an interruption subclass (ISC); number of interruptions allowed (NOI); an adapter interruption bit vector offset (AIBVO); a summary notification (S); an adapter interruption summary bit vector offset (ABVSO); an adapter interruption bit vector (AIBV) address; and an adapter interruption summary bit vector (AISB) address.

Figure 9:
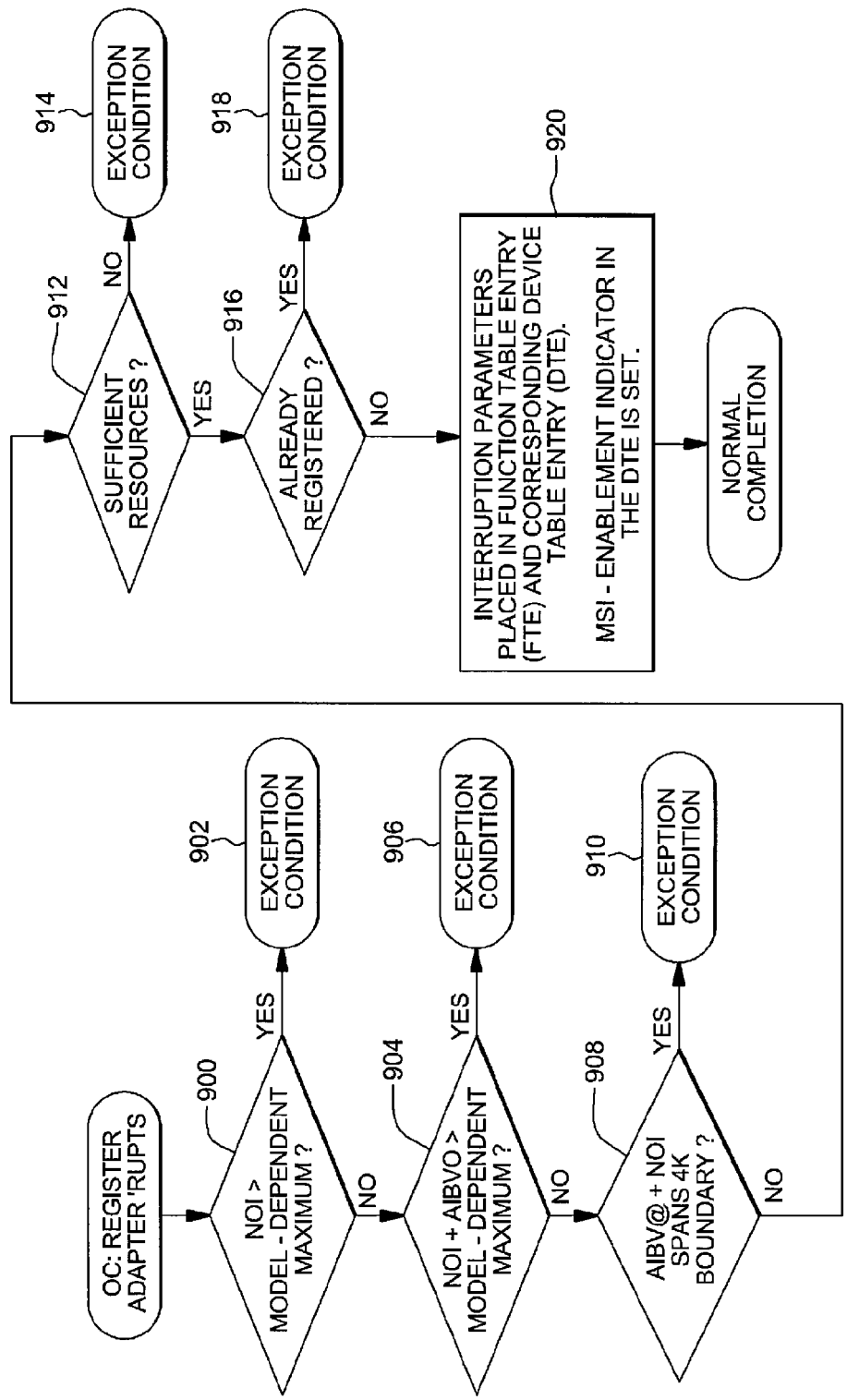
FIG. 9 depicts one embodiment of the logic associated with a register adapter interruptions operation that may be specified by the Modify PCI Function Controls instruction, in accordance with an aspect of the present invention.

Referring to FIG. 9, initially, a determination is made as to whether the number of interruptions (NOIs) specified in the FIB is greater than a model-dependent maximum, INQUIRY 900. If so, then an exception condition is provided, STEP 902. However, if the number of interruptions is not greater than the model-dependent maximum, then a further determination is made as to whether the number of interruptions added to the adapter interruption bit vector offset (NOI+AIBVO) is greater than a model-dependent maximum, INQUIRY 904. If so, then an exception condition is provided, STEP 906. If the NOI plus the AIBVO is not greater than a model-dependent maximum, then a further determination is made as to whether the AIBV address plus the NOI spans a 4 k boundary, INQUIRY 908. If it does span the 4 k boundary, then an exception condition is provided, STEP 910. Otherwise, a determination is made as to whether sufficient resources are available for any resources needed, STEP 912. If there are not sufficient resources, then an exception condition is provided, STEP 914.

Otherwise, a determination is made as to whether adapter interruptions are already registered for this function, STEP 916. In one embodiment, this would be determined by checking one or more of the parameters (e.g., in the DTE/FTE). In particular, parameters associated with interruptions, such as NOI, are checked. If the fields are populated, then the adapter is registered for interrupts. If the adapter is already registered, then an exception condition is provided, STEP 918. Otherwise, the interruption parameters are obtained from the FIB and placed in the device table entry and optionally, in the corresponding function table entry (FTE) (or other specified location). Also, an MSI enablement indicator is set in the DTE, STEP 920. That is, the PCI function parameters relevant to adapter interruption are set in the DTE and optionally, in the FTE based on the information retrieved from the function information block. These parameters include, for instance, the ISC, NOI, AIBVO, S, AIBVSO, AIBV address and the AISB address.

In addition to the above, another operation control that can be specified is an unregister adapter interruptions operation, an example of which is described with reference to FIG. 10. With this operation, the adapter function parameters relevant to adapter interruption are reset.

Figure 10:
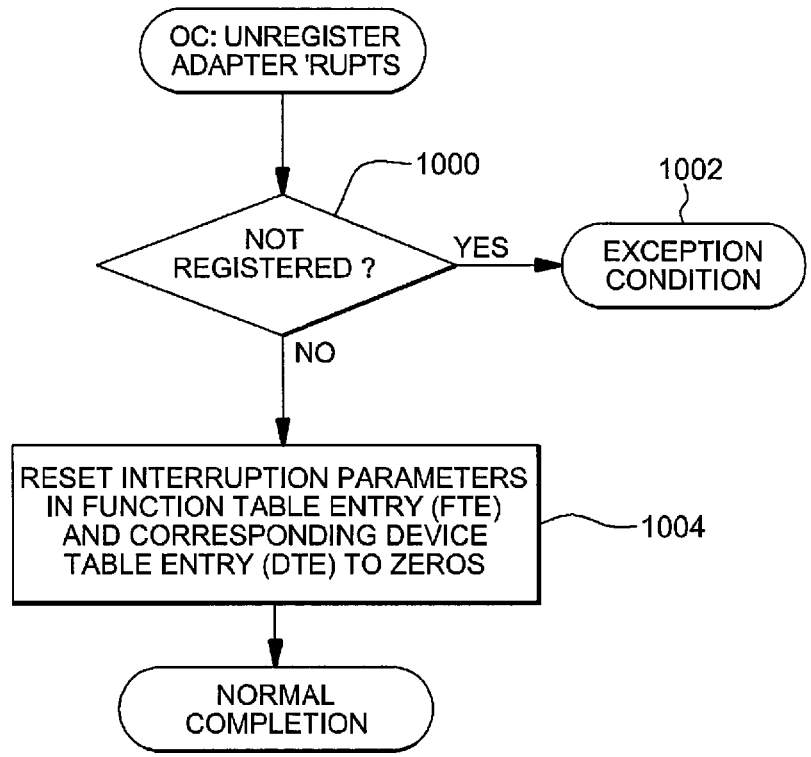
FIG. 10 depicts one embodiment of the logic associated with an unregister adapter interruptions operation that may be specified by the Modify PCI Function Controls instruction, in accordance with an aspect of the present invention.

Referring to FIG. 10, initially, a determination is made as to whether the adapter specified by the function handle is registered for interrupts, INQUIRY 1000. If not, then an exception condition is provided, STEP 1002. Otherwise, the interruption parameters in the function table entry (or other location) and corresponding device table entry are set to zeros, INQUIRY 1004. In one example, these parameters include the ISC, NOI, AIBVO, S, AIBSO, AIBV address and AISB address.

Figure 11A:
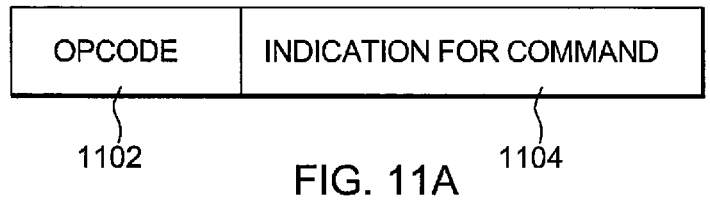
FIG. 11A depicts one embodiment of a Call Logical Processor instruction used in accordance with an aspect of the present invention.

As described above, in one embodiment, to obtain the information regarding an adapter function, a Call Logical Processor instruction is used. One embodiment of this instruction is depicted in FIG. 11A. As shown, in one example, a Call Logical Processor (CLP) instruction 1100 includes an operation code 1102 indicating that it is the Call Logical Processor instruction; and an indication for a command 1104. In one example, this indication is an address of a request block that describes the command to be performed, and the information in the request block is dependent on the command. Examples of requests blocks and corresponding response blocks for various commands are described with reference to FIGS. 11B-13B.

Figure 11B:
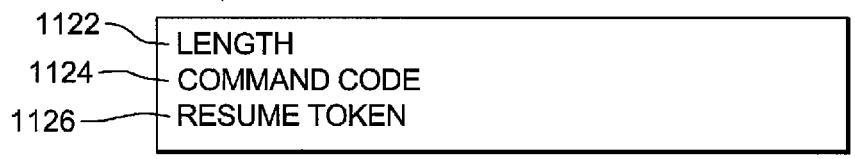
FIG. 11B depicts one embodiment of a request block used by the Call Logical Processor instruction of FIG. 11A for a list operation, in accordance with an aspect of the present invention.

Referring initially to FIG. 11B, a request block for a list PCI functions command is provided. The list PCI functions command is used to obtain a list of PCI functions that are assigned to the requesting configuration (e.g., the requesting operating system). A request block 1120 includes a number of parameters, such as, for instance:

Length field 1122: This field indicates the length of the request block;

Command Code 1124: This field indicates the list PCI functions command; and

Resume Token 1126: This field is an integer that is used to either start a new list PCI functions command or resume a previous list PCI functions command, as described in further detail below.

When the resume token field in the command request block includes, for instance, a value of zero, a new list of PCI functions is requested. When the resume token field includes, for instance, a non-zero value, which was returned from a previous list PCI functions command, a continuation of a previous list PCI functions is requested.

Figure 11C:
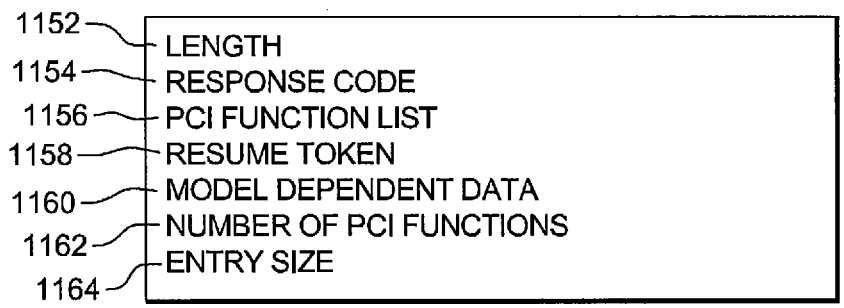
FIG. 11C depicts one embodiment of a response block for the list operation of FIG. 11B, in accordance with an aspect of the present invention.

Responsive to issuing and processing the Call Logical Processor instruction for a list PCI functions command, a response block is returned. One embodiment of the response block is depicted in FIG. 11C. In one example, a response block 1150 for a list PCI functions command includes:

Length field 1152: This field indicates the length of the response block;

Response Code 1154: This field indicates a status of the command;

PCI Function List 1156: This field indicates a list of one or more PCI functions available to the requesting operating system;

Resume Token 1158: This field indicates whether a continuation of a previous list of PCI functions is requested. In one example, when the resume token in the request block and the resume token in the response block are zero, all PCI functions assigned to the requesting configuration are represented in the PCI function list; if the resume token in the request block is zero and the resume token in the response block is not zero, additional PCI functions assigned to the request configuration may exist that have not been represented in the list; if the resume token in the request block is not zero and the resume token in the response block is zero, from the resume point, remaining PCI functions assigned to the requesting configuration are represented in the list; when both the resume tokens in the request and response block are not zero from the resume point, additional PCI functions assigned to the requesting configuration may exist that have not been represented in any associated PCI function list. The resume token remains valid for an indefinite period of time after being returned, but it may be invalid due to a variety of model dependent reasons, including system load elapse time;

Model Dependent Data 1160: This field includes data that depends on the system;

Number of PCI Functions 1162: This field indicates the maximum number of PCI functions supported by the facility; and Entry Size 1164: This field indicates the size of each entry in the PCI function list.

Figure 11D:
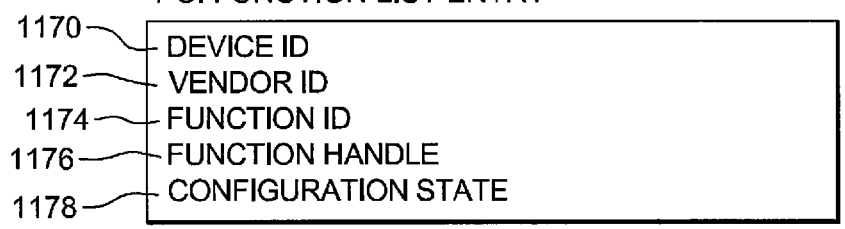
FIG. 11D depicts one embodiment of a function list entry used in accordance with an aspect of the present invention.

Further details regarding the PCI function list are described with reference to FIG. 11D. In one example, the PCI function list includes a plurality of entries and each entry 1156 includes the following information, as an example:

Device ID 1170: This field indicates the I/O adapter associated with the corresponding PCI function;

Vendor ID 1172: This field identifies the manufacturer of the I/O adapter associated with the corresponding PCI function;

Function Identifier 1174: This field includes a persistent identifier of the PCI function;

Function Handle 1176: This field identifies a PCI function. The PCI function handle stored is a general handle when a specified bit of the handle is zero, and it is an enabled handle when that bit is one. If the PCI function is disabled, a general PCI function handle is stored. If the PCI function is enabled, an enabled PCI function handle is stored. A PCI function handle is not, in one example, persistent beyond an IPL, which differs from the PCI function ID, which is persistent and is set for the life of the I/O configuration definition; and Configuration State 1178: This field indicates the state of the PCI function. When this indicator is, for instance, zero, the state is standby, and when, for instance, one, the state is configured. When in standby, the PCI function handle is the general PCI function handle, and when configured, it is either the general or enabled PCI function handle depending on whether the PCI function is enabled.

Subsequent to obtaining the list of adapter functions, information may be obtained regarding the attributes of a selected function as designated by a specified PCI function handle. This information may be obtained by issuing a CLP instruction with a query function command.

Figure 12A:
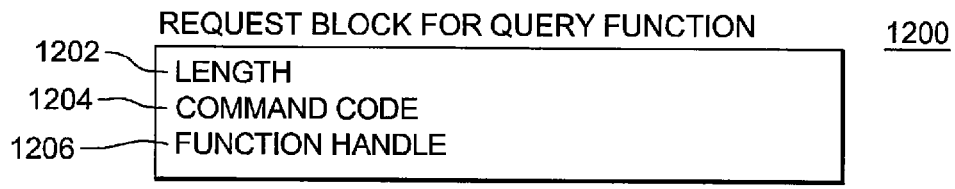
FIG. 12A depicts one embodiment of a request block used by the Call Logical Processor instruction of FIG. 11A for a query function operation, in accordance with an aspect of the present invention.

One embodiment of the request block for a query PCI function command is described with reference to FIG. 12A. In one example, request block 1200 includes, for instance:

Length field 1202: This field indicates the length of the request block;

Command Code 1204: This field indicates the query PCI function command; and

Function Handle 1206: This field includes the PCI function handle (e.g., general or enabled) that designates the PCI function to be queried.

Figure 12B:
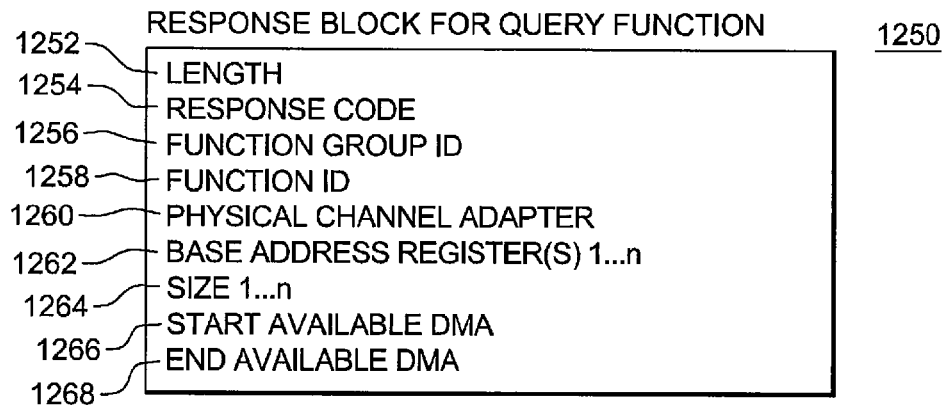
FIG. 12B depicts one embodiment of a response block for the query function operation of FIG. 12A, in accordance with an aspect of the present invention.

Responsive to issuing the Call Logical Processor instruction for the query PCI function command, a response block is returned. One embodiment of the response block is depicted in FIG. 12B. In one example, a response block 1250 includes the following:

Length 1252: This field indicates the length of the response block;

Response Code 1254: This field indicates a status of the command;

Function Group ID 1256: This field indicates the PCI function group identifier. A PCI function group identifier is used to associate a group of PCI functions with a set of attributes (also referred to herein as characteristics). Each PCI function with the same PCI function group identifier has the same set of attributes;

Function ID 1258: The PCI function id is a persistent identifier of the PCI function originally specified by the PCI function handle and is set for the life of the I/O configuration definition;

Physical Channel Adapter 1260: This value represents a model dependent identification of the location of the physical I/O adapter which corresponds to the PCI function;

Base Address Registers (BARs) 1 . . . n 1262: This field includes a plurality of unsigned integers, designated as $BAR_0$-$BAR_n$, which are associated with the originally specified PCI function, and whose values are also stored in the base address registers associated with the PCI function. Each BAR specifies the starting address of a memory space or I/O space within the adapter, and also indicates the type of address space, that is whether it is a 64 or 32 bit memory space, or a 32 bit I/O space, as examples;

Size 1 . . . n 1264: This field includes a plurality of unsigned integers, designated as $SIZE_0$-$SIZE_n$. The value of a Size field, when non-zero, represents the size of each address space with each entry corresponding to a previously described BAR.

Start Available DMA 1266: This field includes an address which indicates the beginning of a range of PCI addresses that are available for DMA operations;

End Available DMA 1268: This field includes a value which indicates the end of a range of PCI addresses that are available for DMA operations.

In addition to obtaining attributes regarding the specific adapter function, attributes may also be obtained regarding the group that includes this function. These common attributes may be obtained from issuing a CLP instruction with a query PCI function group command. This command is used to obtain a set of characteristics that are supported for a group of one or more PCI functions designated by the specified PCI function group identifier. A PCI function group identifier is used to associate a group of PCI functions with the same set of characteristics. One embodiment of a request block for the query PCI function group command is described with reference to FIG. 13A. In one example, request block 1300 includes the following:

Length field 1302: This field indicates the length of the request block;

Command Code 1304: This field indicates the query PCI function group command; and Function Group ID 1306: This field specifies the PCI function group identifier for which attributes are to be obtained.

Figure 13A:
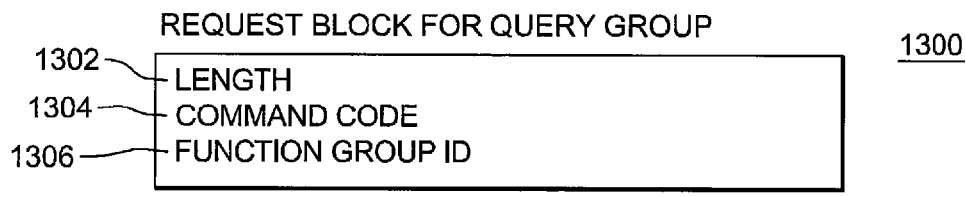
FIG. 13A depicts one embodiment of a request block used by the Call Logical Processor instruction of FIG. 11A for a query group operation, in accordance with an aspect of the present invention.
Figure 13B:
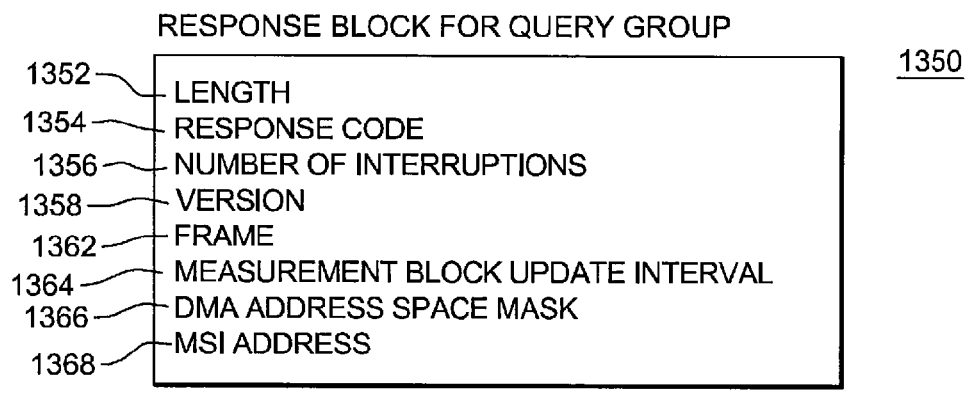
FIG. 13B depicts one embodiment of a response block for the query group operation of FIG. 13A, in accordance with an aspect of the present invention.

Responsive to issuing and processing the Call Logical Processor instruction with a query PCI function group command, a response block is returned. One embodiment of the response block is depicted in FIG. 13B. In one example, a response block 1350 includes:

Length Field 1352: This field indicates the length of the response block;

Response Code 1354: This field indicates a status of the command;

Number of Interruptions 1356: This field indicates the maximum number of consecutive MSI vector numbers (i.e., interruption event indicators) that are supported by the PCI facility for each PCI function in the specified PCI function group. The possible valid values of the number of interruptions are in the range of zero to 2,048, in one example;

Version 1358: This field indicates the version of the PCI specification that is supported by the PCI facility to which the group of PCI functions designated by the specified PCI group identifier are attached;

Frame 1362: This field indicates the frame (or page) sizes supported for I/O address translation;

Measurement Block Update Interval 1364: This is a value indicating the approximate time interval (e.g., in milliseconds) at which the PCI function measurement block is updating;

DMA Address Space Mask 1366: This is a value used to indicate which bits in a PCI address are used to identify a DMA address space; and MSI Address 1368: This is a value that is to be used for message signal interruption requests.

The query list and function commands described above retrieve information from, for instance, the function table. At initialization time, or after a hot plug of an adapter, firmware performs a bus walk to determine the location of the adapter and determines its basic characteristics. This information is stored by the firmware into the function table entry (FTE) for each adapter. Accessibility to the adapter is determined based on policy set by a system administrator and is also set by firmware into the FTE. The query list and function commands can then retrieve this information and store it in their respective response blocks accessible to the operating system.

Further, the group information is based on a given system I/O infrastructure and the capabilities of the firmware and the I/O hub. This may be stored in the FTE or any other convenient location for later retrieval during the query processing. In particular, the query group command retrieves the information and stores it in its response block accessible to the operating system.

Described in detail above is a capability for converting a PCI message signal interruption into an I/O adapter event notification to an operating system. This provides for a low latency interruption request; a delivery of MSIs from a relatively large number of PCI functions to the operating system; and the retaining of the flavor of the MSI vector designation that fits the MSI into the adapter event notification architecture. It adapts to allow the I/O hub to connect to a relatively large number of PCI functions and eliminates the problem of each write to an MSI vector generating a unique interruption.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al., (POU920090029US1); U.S. Ser. No. 12/821,171, filed Jun. 23, 2010, entitled "Runtime Determination Of Translation Formats For Adapter Functions," Craddock et al., (POU920100007US1); U.S. Ser. No. 12/821,172, filed Jun. 23, 2010, entitled "Resizing Address Spaces Concurrent To Accessing The Address Spaces," Craddock et al., (POU920100009US1); U.S. Ser. No. 12/821,174, filed Jun. 23, 2010, entitled "Multiple Address Spaces Per Adapter," Craddock et al., (POU920100010US1); U.S. Ser. No. 12/821,177, filed Jun. 23, 2010, entitled "Converting A Message Signaled Interruption Into An I/O Adapter Event Notification To A Guest Operating System," Brice et al., (POU920100015US1); U.S. Ser. No. 12/821,178, filed Jun. 23, 2010, entitled "Identification Of Types Of Sources Of Adapter Interruptions," Craddock et al., (POU920100016US1); U.S. Ser. No. 12/821,179, filed Jun. 23, 2010, entitled "Controlling A Rate At Which Adapter Interruption Requests Are Processed," Belmar et al., (POU920100017US1); U.S. Ser. No. 12/821,181, filed Jun. 23, 2010, entitled "Controlling The Selectively Setting Of Operational Parameters For An Adapter," Craddock et al., (POU920100018US1); U.S. Ser. No. 12/821,182, filed Jun. 23, 2010, entitled "Load Instruction for Communicating with Adapters," Craddock et al., (POU920100019US1); U.S. Ser. No. 12/821,184, filed Jun. 23, 2010, entitled "Controlling Access By A Configuration To An Adapter Function," Craddock et al., (POU920100020US1); U.S. Ser. No. 12/821,185, filed Jun. 23, 2010, entitled "Discovery By Operating System Of Information Relating To Adapter Functions Accessible To The Operating System," Coneski et al., (POU920100021US1); U.S. Ser. No. 12/821,187, filed Jun. 23, 2010, entitled "Enable/Disable Adapters Of A Computing Environment," Coneski et al., (POU920100022US1); U.S. Ser. No. 12/821,190, filed Jun. 23, 2010, entitled "Guest Access To Address Spaces Of Adapter," Craddock et al., (POU920100023US1); U.S. Ser. No. 12/821,191, filed Jun. 23, 2010, entitled "Managing Processing Associated With Hardware Events," Coneski et al., (POU920100025US1); U.S. Ser. No. 12/821,192, filed Jun. 23, 2010, entitled "Operating System Notification Of Actions To Be Taken Responsive To Adapter Events," Craddock et al., (POU920100026US1); U.S. Ser. No. 12/821,193, filed Jun. 23, 2010, entitled "Measurement Facility For Adapter Functions," Brice et al., (POU920100027US1); U.S. Ser. No. 12/821,194, filed Jun. 23, 2010, entitled "Store/Store Block Instructions for Communicating with Adapters," Craddock et al., (POU920100162US1); U.S. Ser. No. 12/821,224, filed Jun. 21, 2010, entitled "Associating Input/Output Device Requests With Memory Associated With A Logical Partition," Craddock et al., (POU920100045US1); U.S. Ser. No. 12/821,247, filed Jun. 23, 2010, entitled "Scalable I/O Adapter Function Level Error Detection, Isolation, And Reporting," Craddock et al., (POU920100044US1); U.S. Ser. No. 12/821,256, filed Jun. 23, 2010, entitled "Switch Failover Control In A Multiprocessor Computer System," Bayer et al., (POU920100042US1); U.S. Ser. No. 12/821,242, filed Jun. 23, 2010, entitled "A System And Method For Downbound I/O Expansion Request And Response Processing In A PCIe Architecture," Gregg et al., (POU920100040US1); U.S. Ser. No. 12/821,243, filed Jun. 23, 2010, entitled "Upbound Input/Output Expansion Request And Response Processing In A PCIe Architecture," Gregg et al., (POU920100039US1); U.S. Ser. No. 12/821,245, filed Jun. 23, 2010, entitled "A System And Method For Routing I/O Expansion Requests And Responses In A PCIe Architecture," Lais et al. (POU920100038US1); U.S. Ser. No. 12/821,239, filed Jun. 23, 2010, entitled "Input/Output (I/O) Expansion Response Processing In A Peripheral Component Interconnect Express (PCIe) Environment," Gregg et al., (POU920100037US1); U.S. Ser. No. 12/821,271, filed Jun. 23, 2010, entitled "Memory Error Isolation And Recovery In A Multiprocessor Computer System," Check et al., (POU920100041US1); and U.S. Ser. No. 12/821,248, filed Jun. 23, 2010, entitled "Connected Input/Output Hub Management," Bayer et al., (POU920100036US1), each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 14:
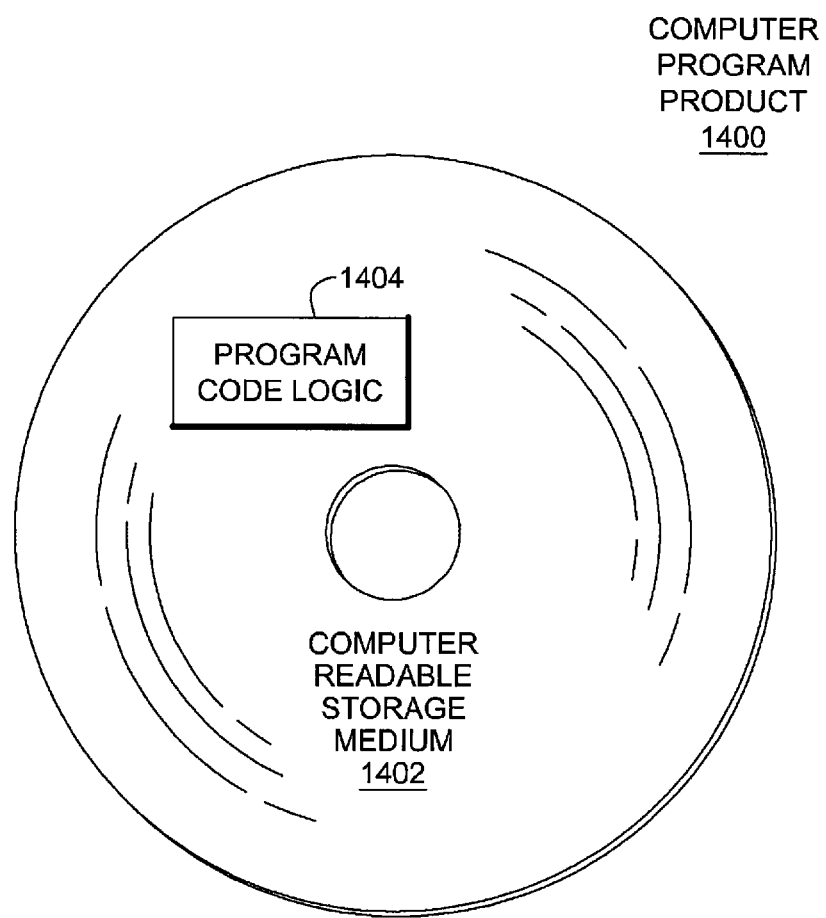
FIG. 14 depicts one embodiment of a computer program product incorporating one or more aspects of the present invention.

Referring now to FIG. 14, in one example, a computer program product 1400 includes, for instance, one or more computer readable storage media 1402 to store computer readable program code means or logic 1404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, although the adapters are PCI based, one or more aspects of the present invention are usable with other adapters or other I/O components. Adapter and PCI adapter are just examples. Further, one or more aspects of the present invention are applicable to interruption schemes other than PCI MSI. Yet further, although examples are described in which bits are set, in other embodiments, bytes or other type of indicators may be set. Moreover, the DTE may include more, less or different information. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 15:
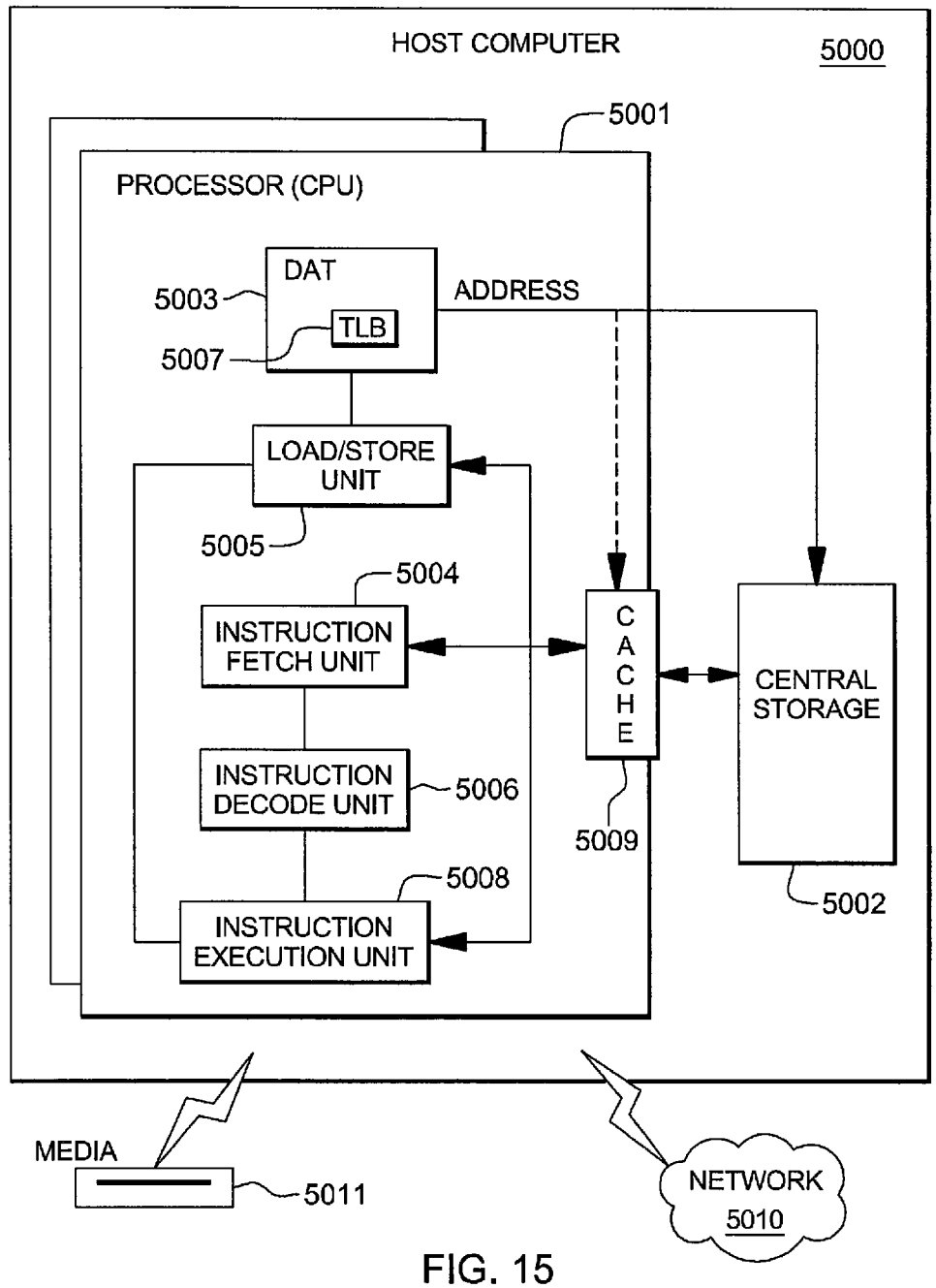
FIG. 15 depicts one embodiment of a host computer system to incorporate and use one or more aspects of the present invention.

Referring to FIG. 15, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 15, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 16:
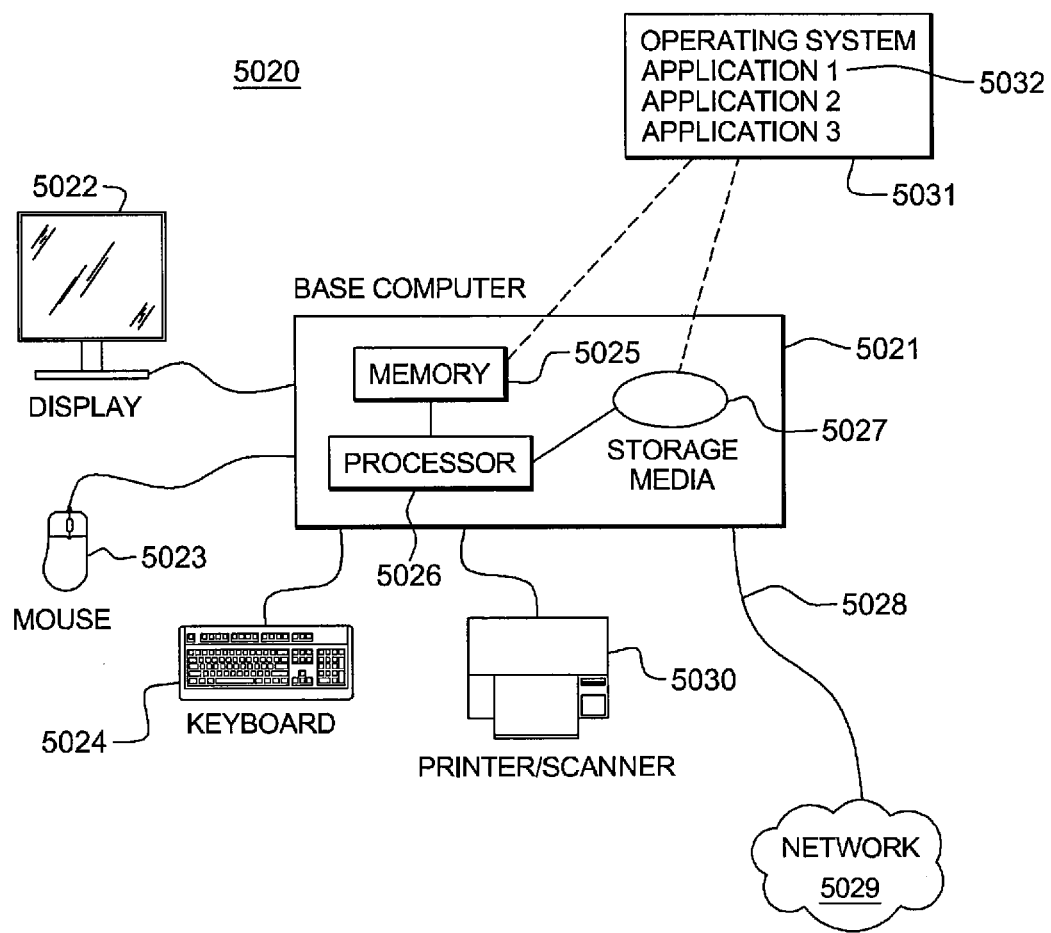
FIG. 16 depicts a further example of a computer system to incorporate and use one or more aspects of the present invention.

FIG. 16 illustrates a representative workstation or server hardware system in which the present invention may be practiced. The system 5020 of FIG. 16 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 17:
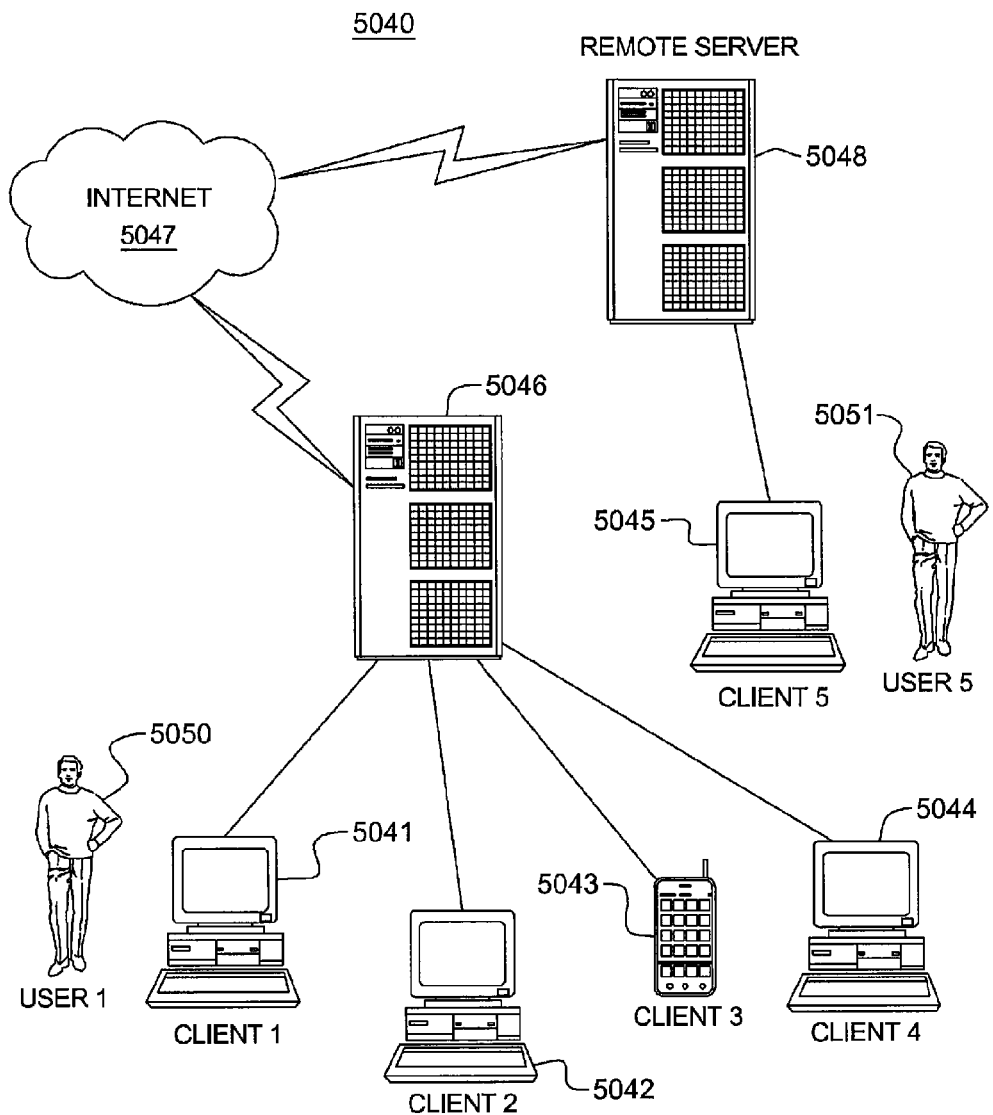
FIG. 17 depicts another example of a computer system comprising a computer network to incorporate and use one or more aspects of the present invention.

FIG. 17 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 17, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 16 and FIG. 17, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 18:
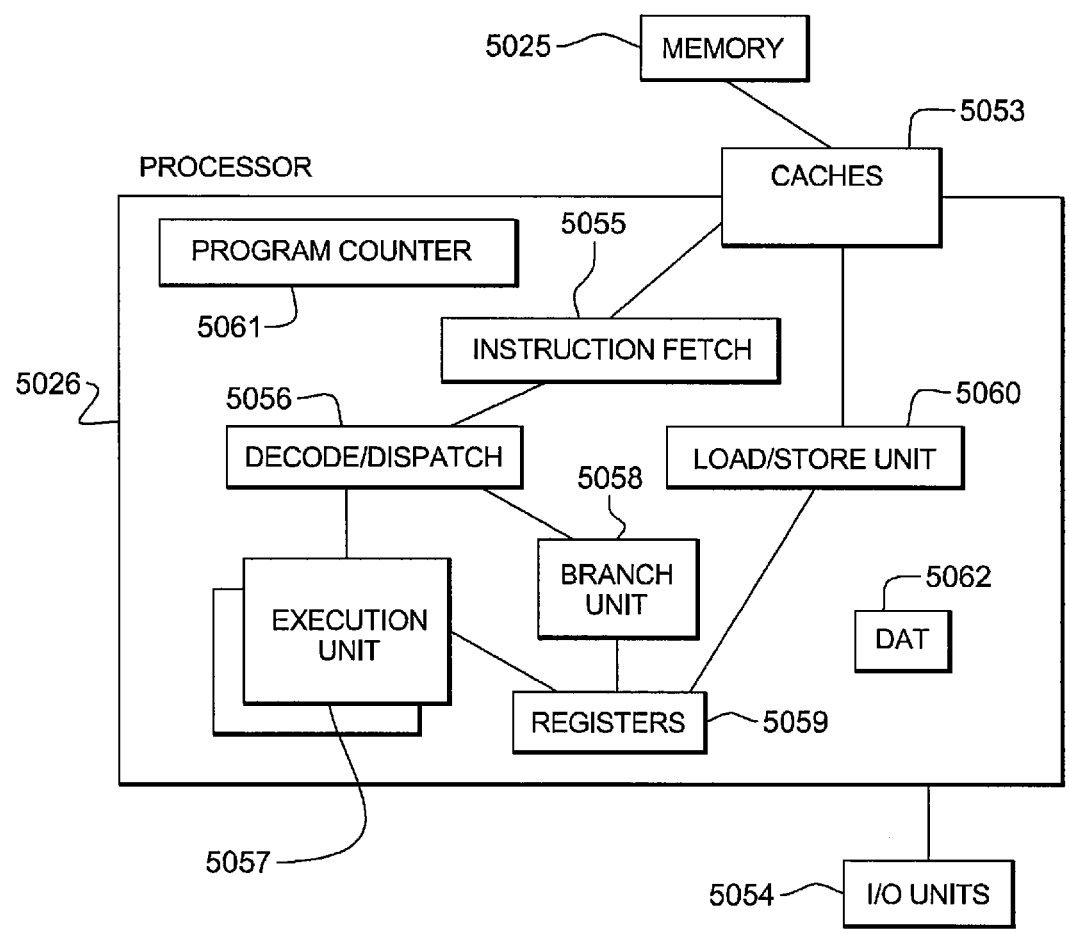
FIG. 18 depicts one embodiment of various elements of a computer system to incorporate and use one or more aspects of the present invention.

Referring to FIG. 18, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 19A:
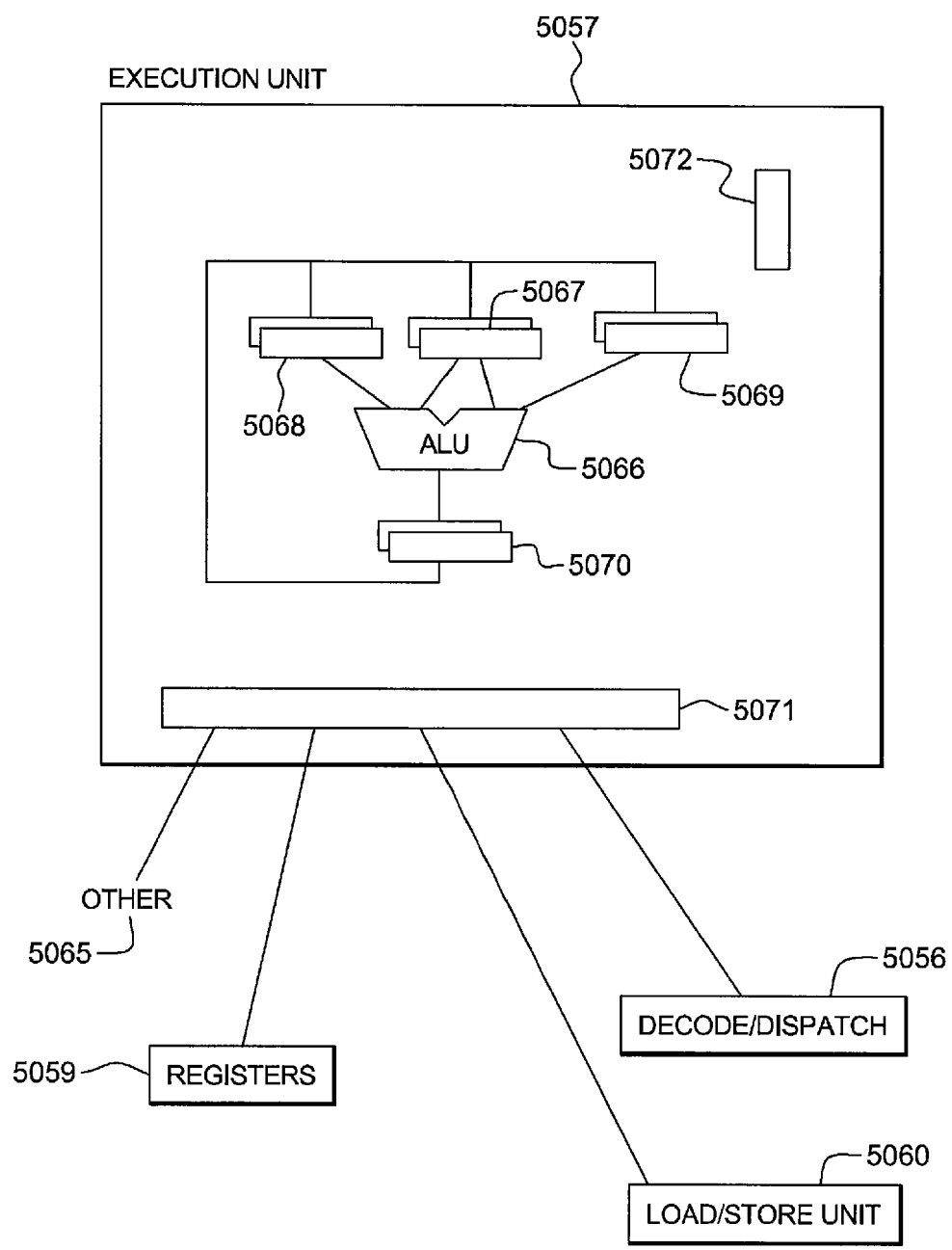
FIG. 19A depicts one embodiment of the execution unit of the computer system of FIG. 18 to incorporate and use one or more aspects of the present invention.

A processor 5026 typically has one or more units 5057, 5058, 5060 for executing the function of the instruction. Referring to FIG. 19A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in short-hand, where a 12 bit field defines an address of a 4,096 byte block and is commonly described as a 4 Kbyte (Kilo-byte) block, for example.

Figure 19B:
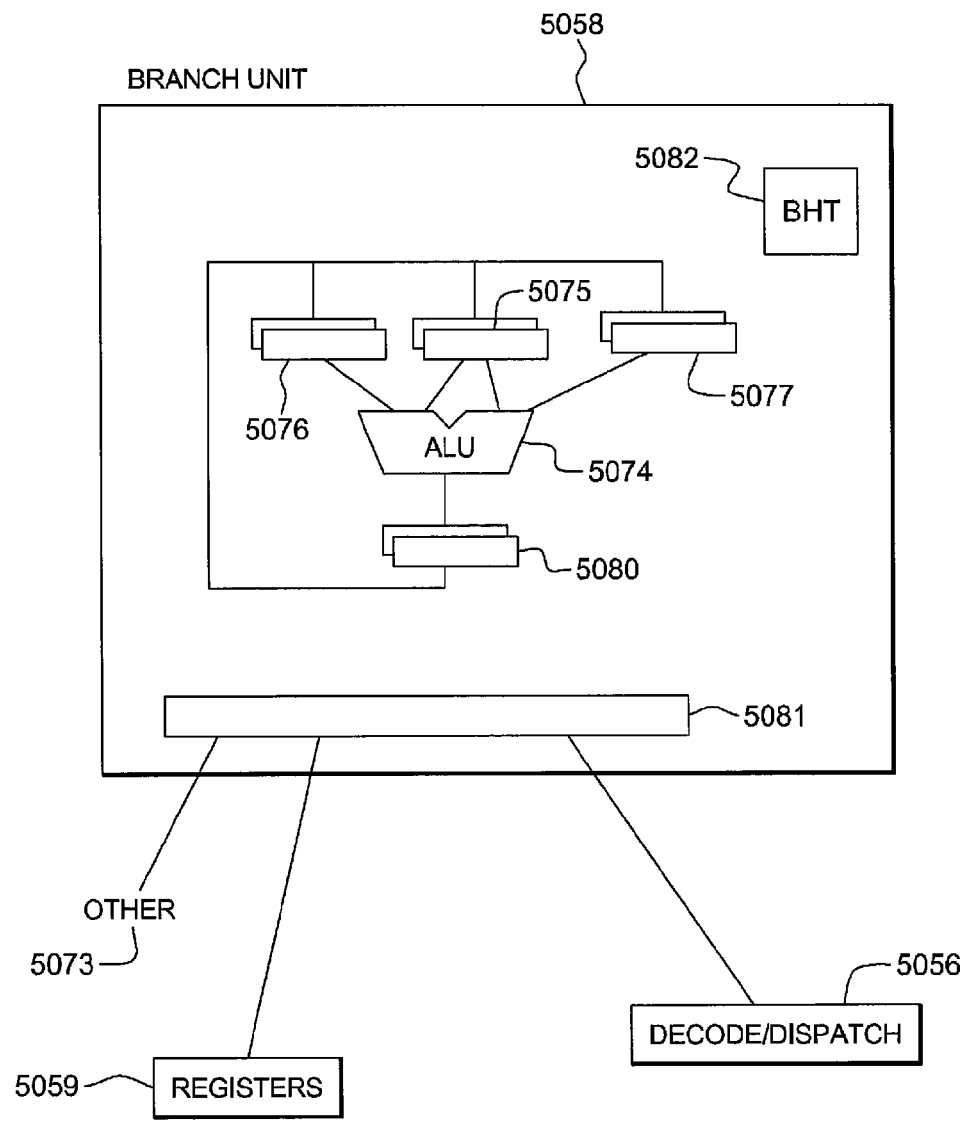
FIG. 19B depicts one embodiment of the branch unit of the computer system of FIG. 18 to incorporate and use one or more aspects of the present invention.

Referring to FIG. 19B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 19C:
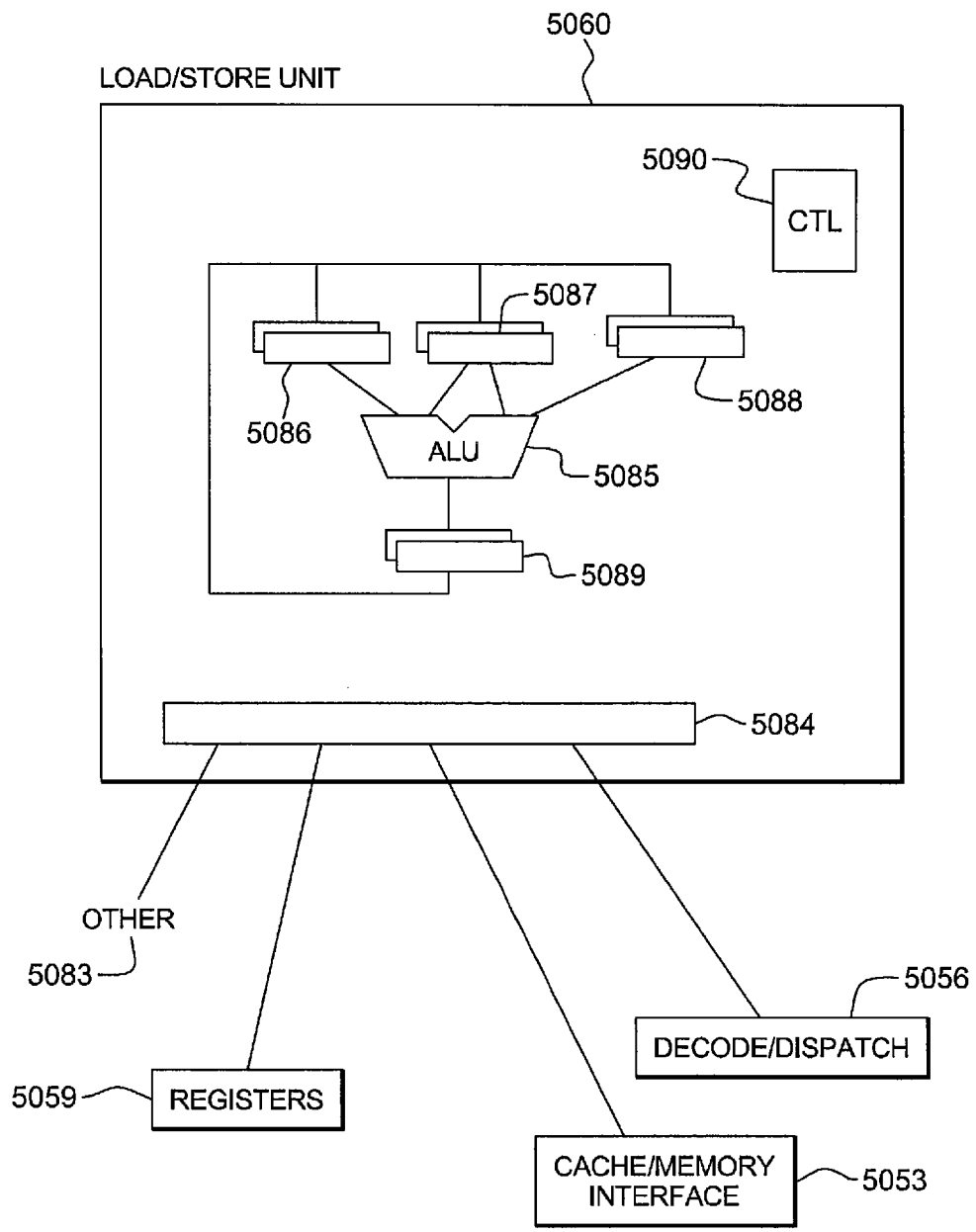
FIG. 19C depicts one embodiment of the load/store unit of the computer system of FIG. 18 to incorporate and use one or more aspects of the present invention.

Referring to FIG. 19C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 18) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 20:
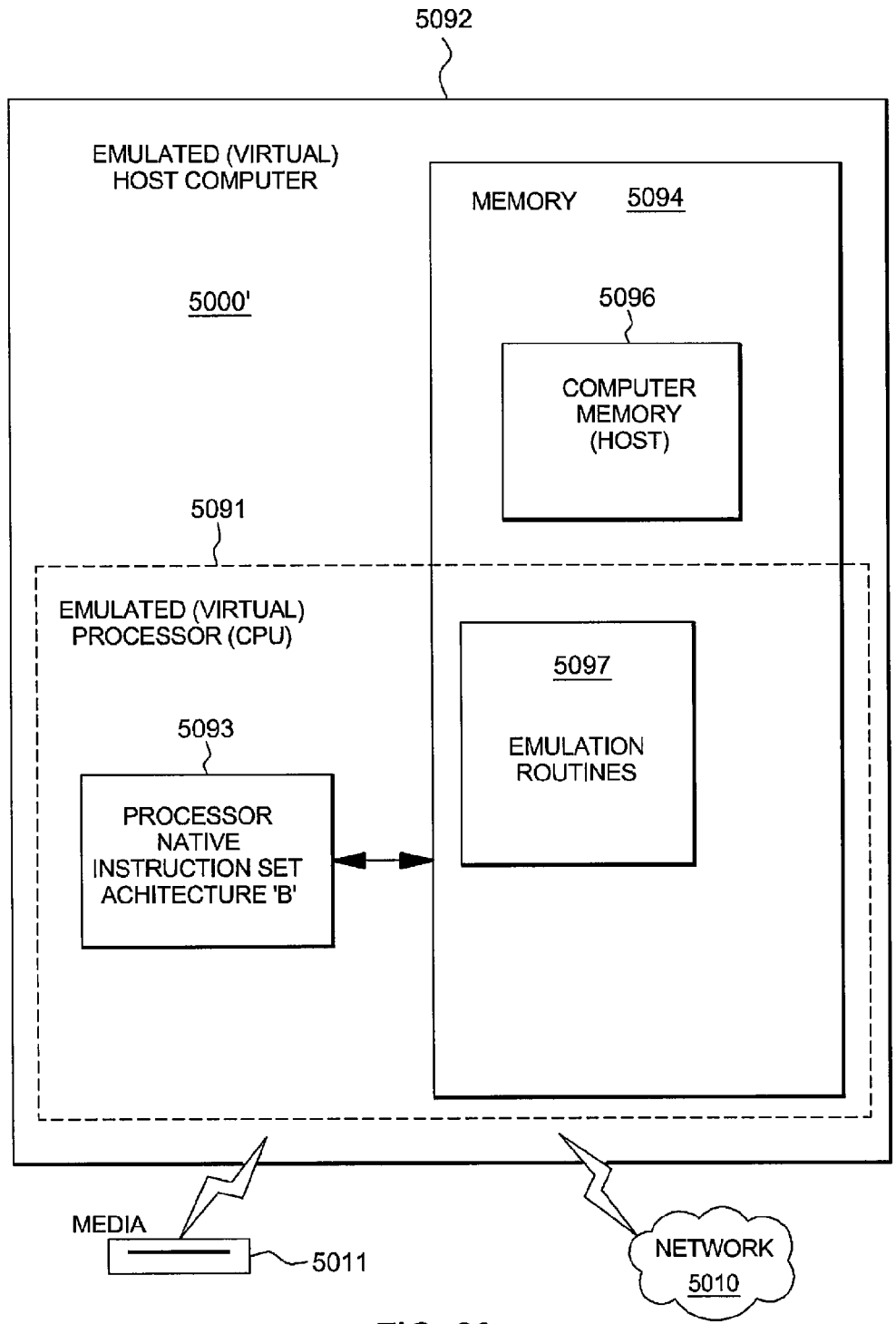
FIG. 20 depicts one embodiment of an emulated host computer system to incorporate and use one or more aspects of the present invention.

In FIG. 20, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of managing interruption requests in a computing environment, the method comprising:
based on executing a register interruptions operation of a Modify PCI Function Controls (MPFC) instruction that specifies a function handle of an adapter, specifying a location in system memory of an adapter interruption bit vector (AIBV) of the adapter, the AIBV included in an array of one or more AIBVs, and a location in system memory of an adapter interruption summary bit (AISB) of an AISB array;
receiving from the adapter a request for interruption; and
based on the received request, setting, by an input/output (I/O) hub coupled to the adapter, an indicator in the AIBV indicating a type of event from the adapter and setting the AISB indicating an indicator is set in the AIBV, wherein the setting the indicator in the AIBV comprises:
determining whether a vector number provided in the request is within a number of interruptions allowed for the adapter; and
based on determining the vector number is within the allowed number of interruptions, using the vector number, an AIBV offset, and an AIBV address to determine the indicator in the AIBV to be set.

2. The method of claim 1, further comprising presenting an interruption to an operating system, the interruption based on the request for interruption.

3. The method of claim 2, wherein the request for interruption represents a plurality of message signaled interruptions, and the interruption to the operating system is part of an input/output adapter event notification for the operating system.

4. The method of claim 2, further comprising obtaining, based on the presenting, one or more AIBV indications for one or more adapters specifying at least one reason for interruption per adapter.

5. The method of claim 4, further comprising obtaining a plurality of AIBV indications specifying a plurality of reasons for interruption, the plurality of reasons for interruption corresponding to the plurality of requests for interruption.

6. The method of claim 5, wherein the obtaining comprises using the AISB in obtaining the one or more AIBV indications in the one or more AIBVs.

7. The method of claim 1, wherein the setting the indicator in the AIBV comprises:
using an identifier of the request from the adapter to obtain a device table entry, the device table entry comprising a value specifying the number of interruptions that are allowed for the adapter; and based on determining the vector number is within the allowed number of interruptions, using one or more parameters of the device table entry to locate a starting position of the AIBV.

8. The method of claim 1, wherein the AIBV for the adapter comprises a plurality of indicators for the adapter, the plurality of indicators indicating a plurality of types of events associated with the adapter.

9. The method of claim 1, wherein the array of one or more AIBVs includes another AIBV for another adapter, and wherein a number of indicators in the AIBV for the adapter is different from the number of indicators in the another AIBV for the another adapter.

10. The method of claim 1, wherein the function handle includes an enable indicator that indicates whether the handle is enabled, a number that identifies the adapter, and an instance number to indicate a particular instance of the handle.

* * * * *